United States Patent
Huibers et al.

(12)

(10) Patent No.: US 6,337,760 B1
(45) Date of Patent: Jan. 8, 2002

(54) ENCAPSULATED MULTI-DIRECTIONAL LIGHT BEAM STEERING DEVICE

(75) Inventors: Andrew G. Huibers, Mountain View; John K. Stockton, Pasadena; Peter J. Heureux, Felton, all of CA (US)

(73) Assignee: Reflectivity, Inc., Santa Clara, CA (US)

( * ) Notice: Subject to any disclaimer, the term of this patent is extended or adjusted under 35 U.S.C. 154(b) by 0 days.

(21) Appl. No.: 09/617,149

(22) Filed: Jul. 17, 2000

(51) Int. Cl.[7] .................. G02B 26/00; G02B 26/08; G02B 6/12
(52) U.S. Cl. .................. 359/291; 359/290; 359/298; 359/223; 385/14
(58) Field of Search ................ 359/290, 291, 359/298, 237, 223, 230; 385/3, 14, 17, 18; 310/90

(56) References Cited

U.S. PATENT DOCUMENTS

| | | |
|---|---|---|
| 3,600,798 A | 8/1971 | Lee |
| 5,629,790 A | 5/1997 | Neukermans et al. |
| 5,648,618 A | 7/1997 | Neukermans et al. |
| 5,784,190 A | 7/1998 | Worley |
| 5,808,780 A | 9/1998 | McDonald |
| 5,835,256 A | 11/1998 | Huibers et al. |
| 5,920,662 A | * 6/1999 | Hinkov ............ 385/14 |
| 6,044,705 A | 4/2000 | Neukermans et al. |
| 6,046,840 A | 4/2000 | Huibers et al. |

OTHER PUBLICATIONS

"The Microphotonics Revolution", P. Fairley, Technology Review, Jul./Aug. 2000, pp. 38–44.
"Development of a Silicon Two–Axis Micromirror for an Optical Cross–Connect", A. Dewa et al., Solid State Sensor and Actuator Workshop, Hilton Head, South Carolina, Jun. 4–8, 2000.

* cited by examiner

*Primary Examiner*—Georgia Epps
*Assistant Examiner*—Michael A. Lucas
(74) *Attorney, Agent, or Firm*—Gregory R. Muir

(57) ABSTRACT

A light beam steering device includes a mirror plate that is mechanically coupled directly (or indirectly) to an optically transmissive substrate by flexures that permit the mirror plate to tilt around a plurality of axes when electrodes are controlled to cause the mirror plate tilting. The optically transmissive substrate is spaced apart from a device substrate so that the mirror plate is between the optically transmissive and device substrates. Electrically conductive electrodes are formed on the device substrate opposite the mirror plate. The direction towards a target of the reflected portion of a light beam that is incident on the mirror plate can be monitored and adjusted using a photodetector array. A plurality of optical (e.g. fiber optic) inputs can direct light to an array of such light beam steering devices, which in turn target a plurality of optical (e.g. fiber optic) outputs. The optical inputs and outputs can be part of the same array, or can be provided in separate arrays, and can be part of an optical switch within an optical network.

80 Claims, 14 Drawing Sheets

ENCAPSULATED MULTI-DIRECTIONAL LIGHT BEAM STEERING DEVICE

BACKGROUND

1. Field of Invention

The present invention relates to micromechanical machines, and in particular to micromechanical mirrors used to direct light beams. This application is related to the subject matter disclosed in U.S. Pat. No. 5,835,256 to Huibers, and U.S. Pat. No. 6,046,840 to Huibers, the subject matter of each being incorporated herein by reference.

2. Related Art

FIG. 1 illustrates one architecture of an optical switch 2 (e.g. an optical cross-connect) using opposing micromechanical mirrors formed, for example, over a silicon substrate. Information carrying (modulated) light signals arrive through input optical fibers 100 that are each coupled to conventional input terminals 101. Each light signal is collimated into a light beam that is directed to one of several output optical fibers 102. Light beam directional steering is accomplished using the micromechanical mirrors in mirror arrays 104 and 106. Fine mirror tilt angle control is desirable to properly direct each light beam to one of several conventional output terminals 103, each coupled to one of the output fibers 102.

For example, a conventional information carrying light signal (e.g., modulated laser light) arrives though input fiber 100b. The signal exits the end of fiber 100b and is collimated by conventional optics (lens) to form light beam 110 that is incident on mirror 104b. Electrodes (not shown) deflect mirror 104b so as to direct beam 110 towards mirror array 106. The angle of deflection for mirror 104b is controlled by a switching algorithm that activates the electrodes such that light beam 110 is directed to the correct mirror in array 106. As depicted, mirror 104b directs beam 110 to mirror 106b, but alternatively may direct the beam to mirror 106a or 106c. The switching algorithm also actuates electrodes (not shown) that control the deflection angles of the mirrors in array 106, thereby directing light beams reflected from array 104 into the output fibers. As shown in FIG. 1, mirror 106a directs light into fiber 102a, mirror 106b directs light into fiber 102b, and mirror 106c directs light into fiber 102c.

FIG. 2 illustrates a second architecture for another micromechanical optical switch 4. This second architecture uses a single micromirror array 120 and a fixed mirror 122 to produce a folded optical path. Input and output optical fibers are mixed in fiber array 124, and each fiber is coupled to conventional input or output terminals 125 as appropriate. Input light signals are collimated into a light beam and directed at a first mirror in array 120. The light beam is reflected from the first mirror in array 120 so as to reflect from fixed mirror 122 onto a second mirror in array 120. The second mirror is then angled to direct the light beam to the appropriate output fiber. For instance, FIG. 2 shows light beam 126 reflecting from mirrors 121a, 122, and 120b to reach output fiber 124b. FIG. 2 also shows mirror 120 alternatively tilted to a second angle so as to reflect beam 126 from mirrors 122 and 120c towards output fiber 124c.

Architectures such as those illustrated in FIGS. 1 and 2 are preferable to cascaded binary cross-over switches for cross-connecting large numbers of optical fibers. A switch using one or two two-dimensional micromechanical mirror arrays can cross-connect, for example, 30×30 optical fiber arrays. In contrast, hundreds of cascaded binary cross-over switches would be required for such a cross-connect.

Micromechanical mirror configurations are known. FIG. 3 shows, for example, "reflective surface" 140 (shown in cutaway by dashed lines) that is "suspended by four flexure hinges" 142 and "posts" 144 as disclosed in U.S. Pat. No. 5,808,780 ['780 patent]. Four "electrodes" 146a–d underlie reflective surface 140.

The '780 patent states that the electrodes are "activated with a known analog voltage. The different levels of voltage available in the analog domain determine which of several deflected states the member assumes. Once a known analog voltage is applied, the segmented electrodes allow fine-tuning of the member's position" in order to maintain the member parallel to it's original position.

As the '780 patent discloses, the embodiment illustrated therein has a mirror with only two stable positions, though the electrodes could allow a third stable position. The '780 patent further states that the illustrated embodiment has only one input light path, though it could have two light paths passing light onto the reflective surface 32. The light could then be switched for one path or the other or both into one of four output paths for the two illustrated positions, or one of six output paths if there were a third position.

It is desirable to have an optical switch with at least one micromechanical mirror array, in which the mirror elements are capable of being deflected to a relatively large number of positions and angles, thereby permitting light beams from a large number of input fibers to be simultaneously directed to a large number of output fibers. Fine mirror tilt angle control is desirable, however, because the beam directed towards an optical fiber typically should be within a few tens of micrometers ($\mu$m) of the output fiber's end for sufficient light to enter the fiber. The control system that provides such fine control should be dynamic in order to compensate for mirror angle variations caused by temperature changes, for example. It is also desirable in some instances to use a digital control system to produce the electrostatic fields used to tilt the mirrors.

SUMMARY

A light beam steering device includes a mirror plate that is mechanically coupled to an optically transmissive substrate by flexures that permit the mirror plate to tilt around a plurality of axes. The plate can be tilted in any direction (up to a tilt angle limit dictated by, e.g. the flexures and the tilt space). Therefore, an input light signal from an N×N array can be directed to any output member on the same array or on a separate NxN output array. The optically transmissive substrate is spaced apart from a device substrate so that the mirror plate is between the optically transmissive and device substrates. Electrically conductive electrodes are formed on the device substrate opposite the mirror plate. The optically transmissive substrate can be fully or substantially transparent.

The mirror plate can be tilted in any direction, up to the tilt angle limit. The mirror is tilted to various angles by creating an electrostatic attractive force between the mirror plate and one or more selected electrodes. In addition, the mirror plate can be pulled away from the optically transmissive substrate by creating an electrostatic attractive force between the mirror plate and all electrodes. The electrodes can be formed in an array having various configurations. The electrodes in some electrode array embodiments receive analog (continuously variable) electric signals. The electrodes in other electrode array embodiments receive electric signals that are associated with one of two binary logic states.

The direction towards a target of the reflected portion of a light beam that is incident on the mirror plate is monitored and adjusted in various ways. In one embodiment the reflected portion of the beam is passed through a beam splitter. One split beam portion continues towards the target (e.g., output fiber) while another split beam portion is incident on a photodetector array. The position of the beam portion that is incident on the photodetector array correlates to the direction of the beam portion directed towards the target. An adjustment circuit uses information from the photodetector array to correct the direction of the beam portion that is traveling towards the target by adjusting the amount of charge on the electrodes under the mirror plate. In another embodiment, a second light source shines light, other than the information carrying light beam, onto the mirror plate. The reflected portion of light from the second light source is incident on a photodetector array. Since both the information carrying light beam and the second light source light are incident on the same mirror, the directions of the reflected portions of each beam are related. Thus the direction of the beam reflected towards the target is adjusted based on the incident position on the photodetector array of the reflected portion of light from the second source. In still another embodiment, photodetectors are positioned around the mirror plate to provide directional information associated with the beam that is incident on the mirror plate.

Therefore, in one embodiment of the invention, there is provided a light beam steering device comprising an optically transmissive substrate, a movable element held on the optically transmissive substrate by a plurality of flexures, with the flexures being coupled directly or indirectly to the optically transmissive substrate and the movable element. The flexures permit the movable element to tilt around a plurality of axes so as to deflect light incoming through the optically transmissive substrate back through the optically transmissive substrate. Also, a device substrate is provided spaced apart from the optically transmissive substrate such that the movable element is between the device substrate and the optically transmissive substrate.

Also provided is an optical switch comprising an optical fiber input terminal, an optical fiber output terminal, and a beam steering device comprising an optically transmissive substrate, a movable plate, and flexures extending from the movable plate and coupled directly or indirectly to the optically transmissive substrate. The flexures permit the movable plate to tilt around a plurality of axes so as to deflect light incoming through the optically transmissive substrate back through the optically transmissive substrate. A device substrate is provided spaced apart from the optically transmissive substrate such that the movable plate is between the device substrate and the Idoptically transmissive substrate.

An optical network is also provided which comprises at least one input fiber capable of carrying information at multiple wavelengths of light, one or more optical demultiplexers for separating multiple wavelengths of light from the at least one input fiber, an optical switch comprising an optical fiber input array comprising a plurality of optical fibers for providing a plurality of light wavelengths for switching, an optical fiber output array comprising a plurality of optical fibers for receiving a plurality of light wavelengths, and a beam steering device comprising an optically transmissive substrate, a plurality of movable elements, flexures extending from each movable element and coupled directly or indirectly to the optically transmissive substrate, and wherein the flexures permit each movable element to tilt around a plurality of axes so as to deflect light incoming from one of the plurality of optical fibers of the optical fiber input array and through the optically transmissive substrate back through the optically transmissive substrate to one of the plurality of optical fibers of the optical fiber output array. Also provided are one or more optical multiplexers for combining multiple wavelengths of light, and at least one output fiber capable of carrying information at multiple wavelengths of light.

Also provided is an optical beam scanner comprising a light source and a beam steering device comprising an optically transmissive substrate, a movable plate, and flexures extending from the movable element and coupled directly or indirectly to the optically transmissive substrate, and wherein the flexures permit the movable plate to tilt around a plurality of axes so as to deflect light incoming through the optically transmissive substrate back through the optically transmissive substrate. Also provided is a device substrate spaced apart from the optically transmissive substrate such that the movable plate is between the device substrate and the optically transmissive substrate, electrically conductive electrodes formed on the device substrate opposite the movable plate, wherein the light source is positioned to direct a light beam onto the movable plate of the beam steering device.

DETAILED DESCRIPTION

The accompanying drawings are illustrative and are not to scale. In addition, some elements are omitted from the drawings to more clearly illustrate the embodiments. Top views are oriented so that the viewer is looking through the optically optically transmissive substrate (when present) towards the underlying structures.

Figure 5:
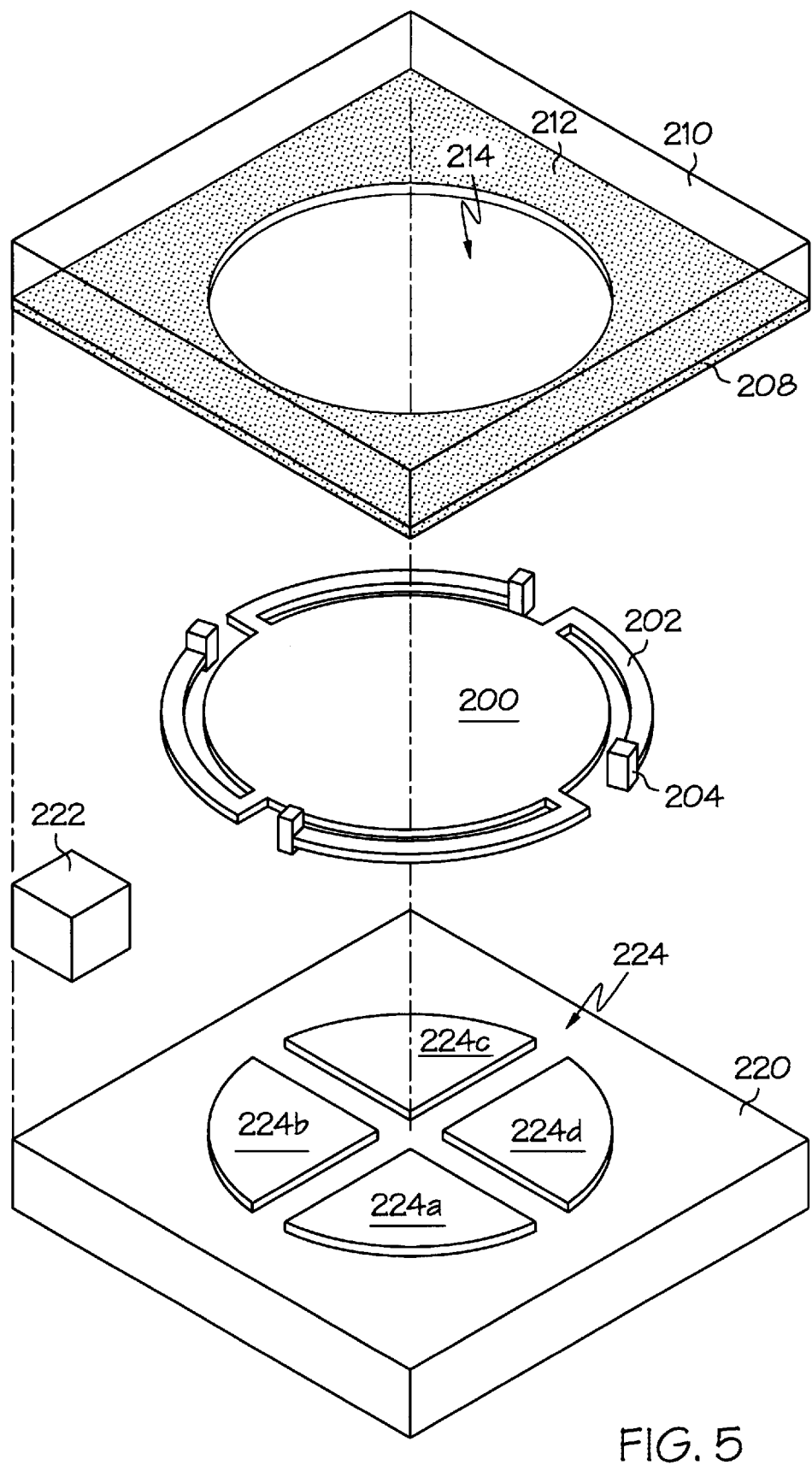
FIG. 5 is an exploded perspective view illustrating one embodiment of a light beam steering device.

FIG. 5 is an exploded perspective view illustrating one embodiment of a light beam steering device. FIG. 5 shows one structure in an array of similarly configured structures that is used, for example, in an optical switch or optical scanner. Mirror plate 200 is suspended by four flexures 202 that are each connected to one of four posts 204. Plate 200 is substantially rigid, whereas flexures 202 are flexible. As described in detail below, plate 200, flexures 202, and posts 204 are formed on the bottom surface 208 of optically transmissive substrate 210 (e.g., glass). Substrate 210 is optically transmissive to light (e.g., infrared, visible, or ultraviolet). One layer of plate 200 is electrically conductive and is electrically coupled to a conventional circuit (not shown) that places, for example, a negative electric charge on the conductive portion of plate 200.

Opaque (light blocking) layer 212 is formed on bottom surface 208 (or within or on a top surface of optically transmissive substrate 210), and clear area 214 in layer 212 is vertically coincident with plate 200 so that light passing through substrate 210 is incident on plate 200. Opaque layer 212 assists in preventing light from scattering within the beam steering device. Layer 212 is omitted in some embodiments.

Device substrate 220 is positioned below the substrate 210 and mirror plate 200 assembly and is spaced apart from substrate 210 by pillar 222. A plurality of pillars 222 are used in a large mirror array. The deflectable reflective elements of the present invention can be large (100 micron diameter and bigger) so that the spacer also needs to be big if there is to be significant tilting angles. The spacers can either be discrete shims (including for example glass rods or balls that are commonly used for spacers in optical applications) that are glued in place, or they can be fabricated on one of the substrate, for example using the SU-8 Epoxy-photoresist process. The pillars are, for example, composed of Micro-Chem Corp. SU-8 25 photoresist. This can be spin-coated on either substrate, typically at 560 RPM for 20 seconds, followed by a bake of 10 minutes at 65 degrees C. and a bake of 25 minutes at 90 degrees C., and exposure at wavelengths between 350 and 400 nm using conventional photolithographic methods. This is followed by a 1 minute 50 degrees C. post-exposure bake and wet develop using SU-8 developer to create a patterned 125 micron thick film. Different spin speeds and SU-8 photoresist viscosities can be used to create other pillar heights. The pillars can be attached to the other substrate using a wide variety of epoxies or other adhesives.

An advantage of fabricating the movable elements on the light transmissive substrate (rather than on the device substrate) for light beam steering devices, is that it is much easier to create a sufficient tilt space for mirrors having relatively large dimensions (e.g. up to 500 or 1000 μm). If fabricating the mirrors on the device substrate, it is necessary to hold the mirrors sufficiently high above the device substrate so that there is sufficient room for mirrors of this size to tilt at angles sufficient to target many optical outputs in a large optical output array. In order to hold the mirrors on the device substrate at a sufficient height, it is necessary to create pillars by adding layer upon layer to the device substrate. Very large mirrors with large tilt angles could require hundreds of layers to be added, prior to forming the mirrors to be held by such laminated pillars. This is not only time consuming and costly, but it greatly increases the possibility of error and lowers yield. In contrast, by holding the mirrors on the light transmissive substrate, a) the mirrors will tilt away rather than towards the substrate to which they are attached, b) the mirrors can be pulled away from the substrate prior to tilting, and c) a simple spacer (pillars) can be placed between the light transmissive and device substrates prior to assembly, thus avoiding the need to build up the device substrate, layer by layer, to create enough tilt space.

Electrically conductive electrodes 224a, 224b, 224c, and 224d are formed on top surface 226 of device substrate 220. Each electrode 224a–d is electrically coupled to active control circuitry (not shown) that places, for example, a positive electric charge on one or more of electrodes 224a–d. During operation, electric charge of one polarity (e.g., negative) is placed on the mirror plate and varying amounts of electric charge of the opposite polarity (e.g., positive) are placed on one or more electrodes. Thus, the electrostatic attractive force between the charged electrodes and the mirror plate causes the mirror plate to tilt. In addition, an identical amount of electric charge of the same polarity may be placed on each electrode 224a–d, but opposite polarity to that of the mirror plate, thus evenly pulling the mirror plate away from the optically transmissive substrate without tilting the mirror plate.

Figure 6:
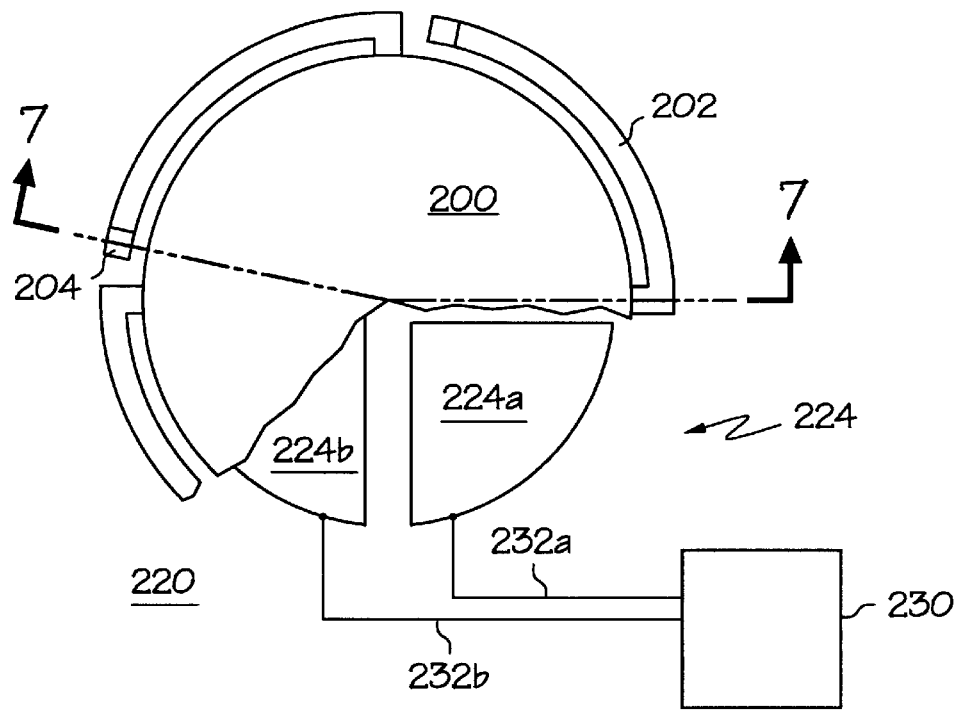
FIG. 6 is a top view showing a portion of a mirror plate and underlying electrodes.

FIG. 6 is a top view showing a portion of mirror plate 200 cut away to reveal the orientation of the underlying electrodes 224. In the embodiment shown in FIG. 6, four unique electrically conductive electrodes are used, and each electrode has a quarter-circle shape. Other embodiments have other numbers of electrodes with different shapes. Active electrode control circuit 230 is shown electrically connected via lines 232a and 232b to electrodes 224a and 224b, respectively, to illustrate that each electrode underlying each mirror in the mirror array is electrically coupled to the control circuit. In the embodiment shown, control circuit 230 provides a unique analog voltage signal to each electrode. The magnitude of the voltage (amount of charge) applied to each electrode is determined by the control algorithm that determines the proper deflection angle for each mirror in the array at any given time. For example, in a feedback control algorithm, a sensor (not shown) determines the position of a mirror, and then electrode voltages are adjusted appropriately to bring the mirror to the desired position. The correct voltages are approximately known from an internal model of the basic electromechanical properties of the mirror/flexure/electrode system. A feedback algorithm can correct for slight imperfections in the as-manufactured structure and time-varying changes in the properties of the mirror and flexures, such as thermal expansion. In some embodiments control circuit 230 also applies a constant bias voltage (amount of charge) to all electrodes so as to pull all mirrors away from the optically transmissive substrate. Other mirror angle control methods and electrode configurations are discussed below.

FIGS. 7A–7E are cross-sectional views taken along cut line 7—7 in FIG. 6 that illustrate an embodiment of a light beam steering device that is formed using the surface micromachining (thin film) fabrication process. The surface micromachining process generally produces thinner, and consequently lighter and faster moving, movable elements than bulk micromachining process which use significant parts of the (usually silicon) substrate as mechanical elements.

Figure 7A:
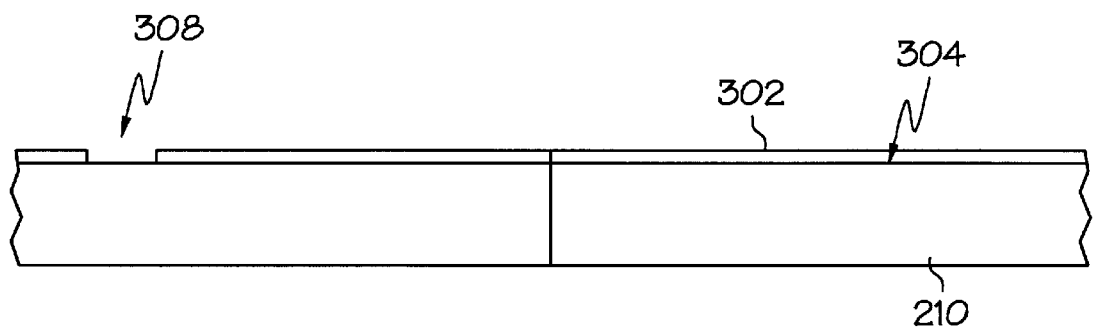
FIGS. 7A–7E are cross-sectional views taken along cut line 7—7 in FIG. 6 and illustrating fabrication of a beam steering device.

FIG. 7A shows sacrificial layer 302 formed over "bottom surface" 304 of optically transmissive substrate 210 Many different suitable optically transmissive substrates are possible, including glass, Pyrex™, tempered glass, quartz, sapphire, lithium niobate, and optically transmissive high melting point polymers.

Surface 304 is termed the "bottom" because substrate 210 is inverted over the device substrate when the beam steering device is assembled. In some embodiments an opaque layer (not shown, but see e.g., FIG. 5 element 212) is formed over bottom surface 304, and is conventionally patterned and etched to allow light to pass through the optically transmissive substrate over the mirror but to block light from reaching other portions of the underlying device substrate. In some embodiments the opaque layer is patterned and etched to allow light to reach light sensors positioned on the device substrate as described below. This layer can be made of, for example, a 100 nm thick layer of Titanium, made using conventional sputtering and patterning techniques known in the semiconductor industry.

Sacrificial layer 302 is a conventional amorphous silicon layer deposited using a conventional parallel plate plasma-enhanced chemical vapor deposition (PECVD) system utilizing $SiH_4$ (silane) and argon gasses. In other embodiments in which the thermal budget of substrate 210 allows (e.g. the deposition process for layer 302 remains below the glass transition temperature of substrate 210), layer 302 is a conventional polycrystalline silicon (polysilicon) layer deposited using conventional low pressure chemical vapor deposition methods. Layer 302 is 5–10 micrometers ($\mu$m) thick, although other thicknesses may be used depending on the desired spacing between the mirror plate and the optically transmissive substrate. Layer 302 is conventionally patterned and etched to form vias 308 (one is shown) in which the support posts are formed.

Figure 7B:
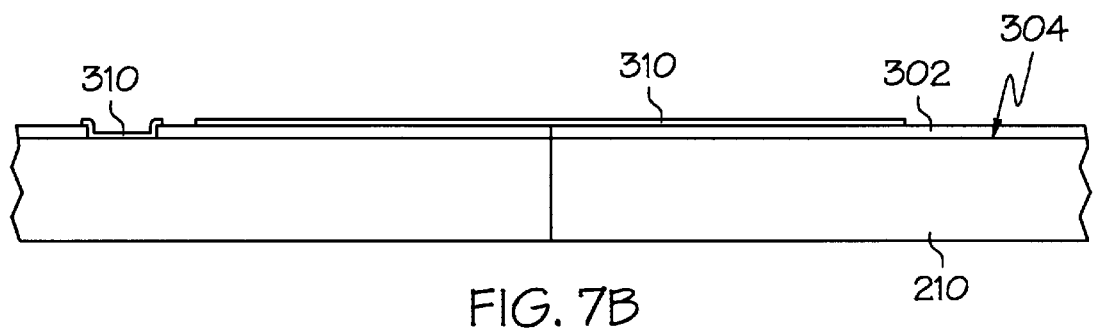

Mirror structural support layer 310 is formed over sacrificial layer 302, as shown in FIG. 7B. Structural support layer 310 is conventionally patterned and etched to form the mirror support plate (e.g., FIG. 5 element 200) and the support posts that attach the flexures to substrate 210. The mirror is, for example, approximately 500 $\mu$m in diameter. In one instance layer 310 is a conventional silicon nitride layer that is conventionally deposited using a parallel plate PECVD system and silane, nitrogen, and nitrous oxide gasses (e.g. 2000 sccm flow of N2, 25 sccm flow of SiH4, a pressure of 1.5 torr, and a temperature of 350 degrees C., power of 150 W for a 150 mm wafer, and electrode spacing of 10 mm) to produce a thickness of 0.5–2.0 $\mu$m.

Figure 7C:
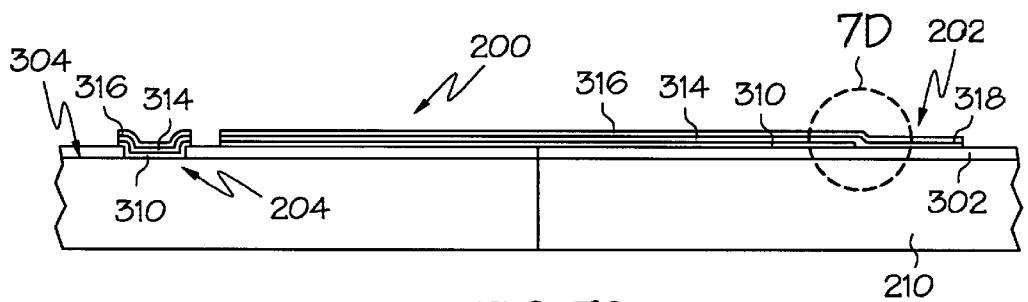
Figure 7E:
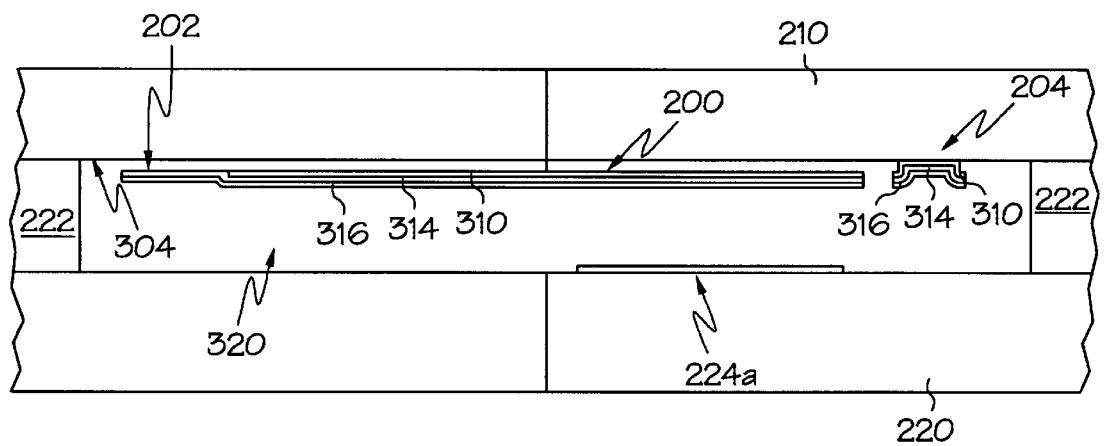
Figure 7D:
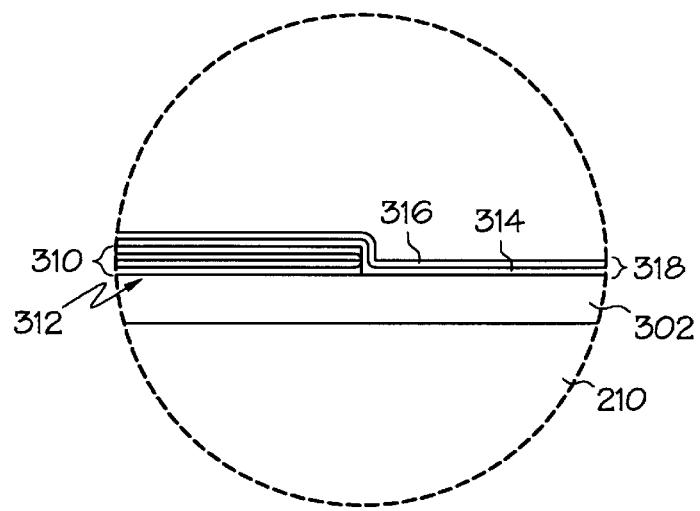

In some embodiments structural layer 310 is a laminate of several thin layers, illustrated in FIG. 7D. A 1.0 $\mu$m thick layer 310, for example, is made of four 0.25 $\mu$m thick laminate layers 312. The underlying substrate is allowed to cool between depositions of each silicon nitride laminate layer 312. It is well-known that a stress gradient typically exists in a thin film after deposition, due to, for example, heating of the substrate during the film deposition process. A large (e.g., 500 $\mu$m) mirror plate formed of such a film could, in some situations, curl or deform when released from the sacrificial layer if the stress gradient is sufficiently large. Forming layer 310 as a laminate of identical films greatly reduces the effect of the stress variations in the structural layer, plotted as a saw tooth for example, and consequently eliminates mirror plate curling. The use of silicon nitride and the number of laminate layers is illustrative, and many acceptable variations exist.

Referring to FIG. 7C, hinge layer 314 is formed over support layer 310. In one instance layer 314 is a 0.1–0.2 $\mu$m thick conventionally deposited conventional silicon nitride layer. Since the hinge layer also contributes to the mirror laminate, the stress properties need to be compatible with the flatness requirement of the mirror laminate. For example, the hinge layer can be an identical film as laminate layers 312. Reflective layer 316 is electrically conductive and is formed over hinge layer 314. In one instance layer 316 is a 30–50 nanometers (nm) thick aluminum layer. The aluminum layer, when used, is kept thin to reduce mechanical stress contributions to the mirror plate, and also because aluminum does not fatigue well. Gold can also be used to obtain good reflectivity at infrared wavelengths. The aluminum or gold film can be deposited by conventional thermal or electron-beam evaporation techniques, which produces smooth films with low stress. After the light beam steering device is assembled, reflective layer 316 reflects light that passes through substrate 210 and is incident on the mirror. Since layer 316 is behind layers 310 and 314, layers 310 and 314 are important to the optical reflectivity of the mirror. To achieve optimal reflectivity, the total thickness of layers 310 and 314 can be chosen such that they the optical path through them (physical path length multiplied by optical index) is equal to a multiple of one half of the wavelength of the light being reflected. Layer 316 also allows electric charge to be placed on the mirror plate through electrically conductive interconnects, discussed below. Layers 314 and 316 together form flexure layer 318 that is conventionally patterned and to form the flexures (e.g., FIG. 5 element 202) that support the mirror plate. The flexures in one embodiment are approximately 2 $\mu$m wide to permit easy lithographic patterning.

The built-up structure on substrate 210 is conventionally exposed to xenon difluoride ($XeF_2$) gas (e.g. near its room temperature vapor pressure of approximately 4 torr) to remove sacrificial layer 302, thereby freeing the mirror plate and flexures from contact with substrate 210 and allowing mirror plate movement. Removal of the sacrificial layer is disclosed in more detail in U.S. patent application Ser. No. 09/427,841, incorporated herein by reference.

It is also possible to form the hinge/reflective layer first with the structural support layer formed over the hinge layer (or a structural support layer on each side of the reflective layer). However, it is often the case that the nitride will go down hotter (350 C.) than the reflective metal (e.g. gold or aluminum or a combination thereof) layer, and this may cause the metal layer to have residual tensile stress when the substrate cools back down.

After the sacrificial layer is removed, the optically transmissive substrate and mirror assembly is inverted and positioned over device substrate 220 (e.g., crystalline silicon that may include active electronic devices such as transistors) so that mirror 200 is aligned over electrodes 224. Support pillars 222 (20 to 500 microns high) separate substrates 210 and 220 to allow the mirror to deflect. In some embodiments the pillars separate the substrates to allow a mirror tilt angle of at least 10 degrees with respect to surface 304, or even tilt angles as high as 25 degrees (though a tilt angle of from 1 to 15 degrees is preferred). The pillars can be bonded to the substrates such as with adhesive, the two substrates can be aligned with an optical microscope with a large depth of field. In order to avoid damaging the mirrors and traces as the two substrates are aligned, it can be preferable to do gross alignment first, then fine alignment.

The space 320 between substrates 210 and 220 may be evacuated or filled with a gas such as Argon or Nitrogen to change the mirror deflection time and level of motion damping. To maintain the pressure, the device would need to be sealed to the environment. A metal/solder seal may be desirable, though an epoxy seal can also be used. The space is evacuated by evacuating a vacuum chamber with a pump, then making the seal at the desired pressure. The gas is bled into the vacuum chamber prior to forming the seal in order to provide the gas within the device. The assembly could be sealed against leakage in a conventional way (e.g. as a light bulb is conventionally backfilled with Argon and sealed).

Flexures illustrated herein are shown as thin ribbons. Other flexure cross-sections may be used (e.g., I-beam shape or double ribbon) to provide different physical characteristics (e.g., bending to torsion ratio) to the flexures. By "flexure" it is meant any element that flexes, twists, bends, pivots, or otherwise allows for movement of the mirror plate.

Figure 8:
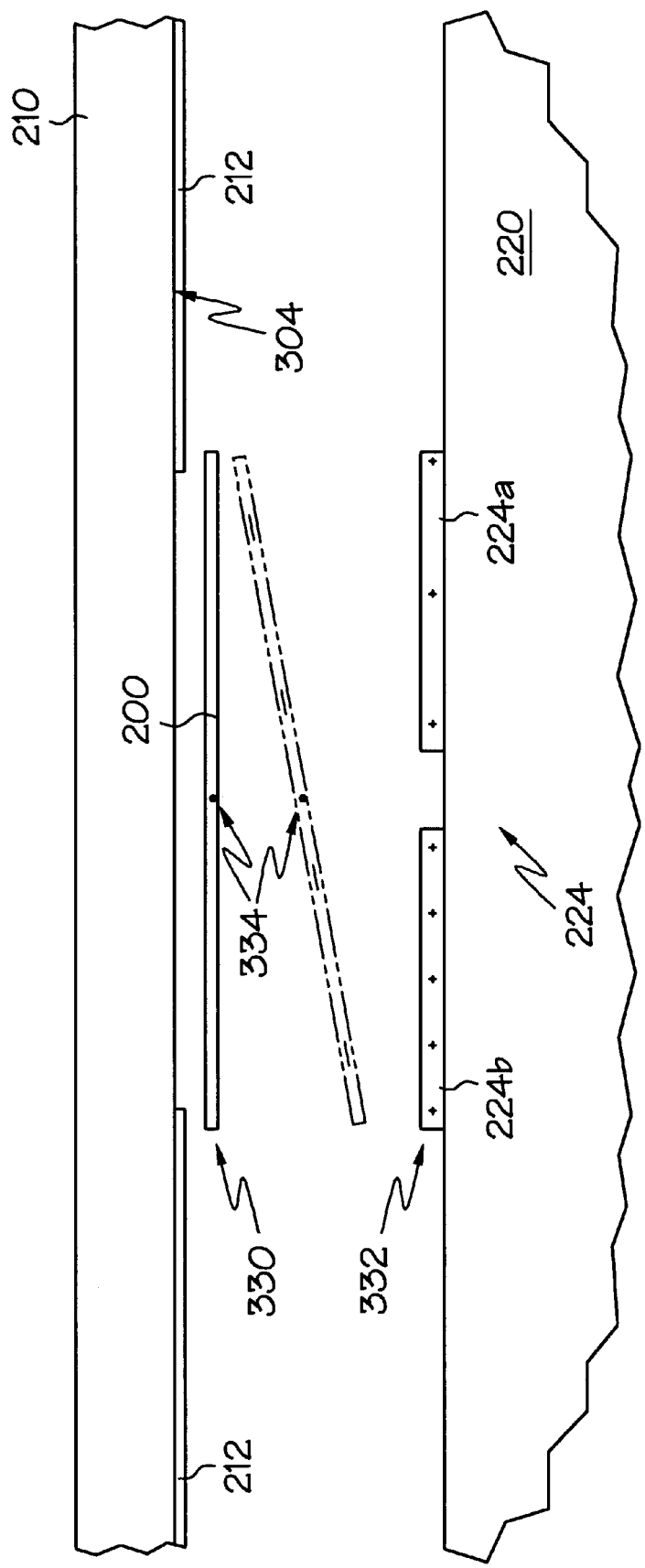
FIG. 8 is a cross-sectional view illustrating mirror operation using opposite electrical charges placed on a mirror plate and electrodes.

FIG. 8 is a cross-sectional view that illustrates mirror operation using opposite polarity electrical charges placed on the mirror plate and the electrodes. As shown in FIG. 8, mirror plate 200 is in a nondeflected position 330 when no electrostatic attractive force exists between plate 200 and electrodes 224. Mirror plate 200 is in an illustrative deflected position 332 when an electrostatic attractive force exists between the mirror plate and the electrodes. The electrostatic force between the mirror plate and the electrodes is caused by conventionally placing, for example, negative electric charge (illustrated by "−" signs) on the mirror plate and positive electric charge (illustrated by "+" signs) on the electrodes. A constant differential "bias" force between mirror plate 200 and all electrodes 224 is caused by placing an equal amount of charge on each of the electrodes 224. This bias force pulls the mirror plate away from optically transmissive substrate and towards active substrate 220 while keeping the mirror plate parallel with bottom surface 304 of substrate 210. An additional amount of opposite polarity charge (illustrated by additional "+" signs) is placed on one or more electrodes, e.g., electrode 224b as shown, so as to cause a localized electrostatic attractive force that tilts the mirror into deflected position 332. From FIG. 8 it can be seen that if mirror 200 is tilted from position 330 without first being pulled away from the optically transmissive substrate, the mirror will pivot around axis 334 and one edge will strike substrate 210. Pulling mirror 200 away from substrate 210 allows mirror 200 to be deflected to a larger angle as the mirror pivots around axis 334 so that the edge closest to substrate 210 does not touch the substrate A differential voltage in the range of 0.0–50.0 Volts (higher may be used), preferably from 5 to 16 Volts, causes the charge difference between the mirror plate and the electrodes. If space 320 is evacuated, the time required for full deflection of mirror plate 200 from a non-deflected to a fully deflected position is approximately 100 microseconds ($\mu$sec).

Figure 9:
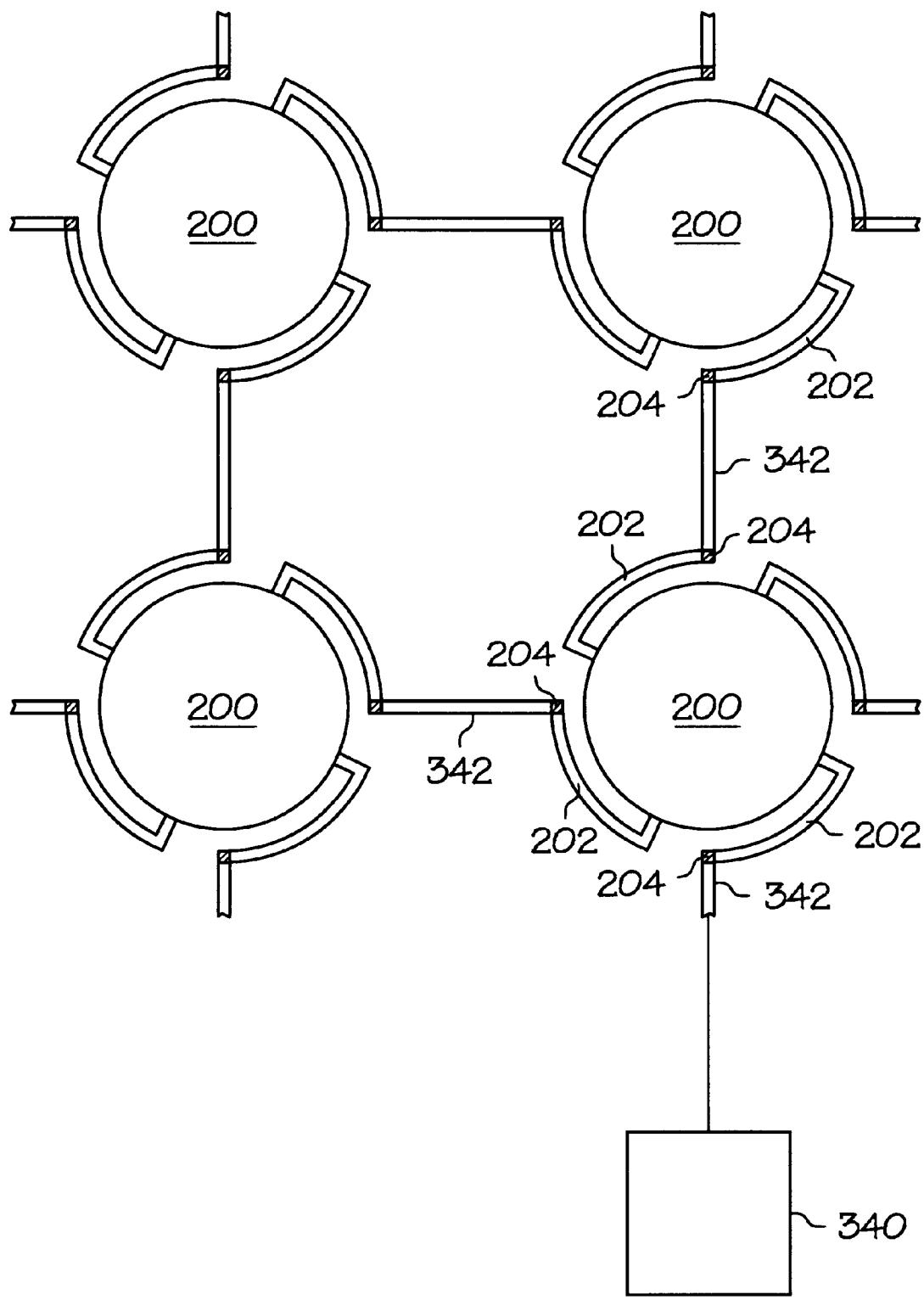
FIG. 9 is a top view illustrating an embodiment of electrical interconnection among mirrors.

FIG. 9 is a top view illustrating one electrical interconnection structure using electrically conductive interconnect traces 342 to electrically couple mirrors 200. Conventional voltage source 340 supplies constant electric charge (e.g., negative charge) on one conductive interconnect 342. The voltage applied can be positive or negative. In some instances voltage source 342 is electrically coupled to the mirrors through a conventional connection pad conventionally formed on the perimeter of the optically transmissive substrate. The charge is distributed among all mirrors by interconnects 342 and the electrically conductive layer on each of the support posts 204, flexures 202, and mirrors 200.

Figure 10:
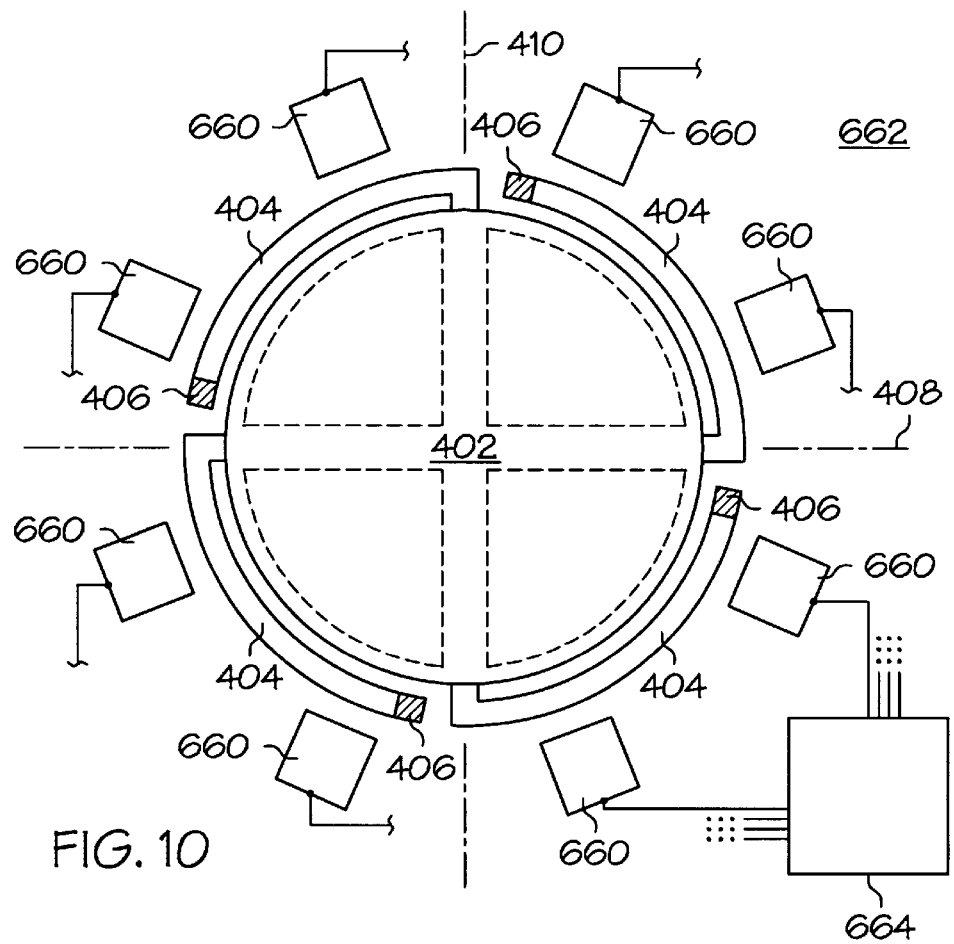
FIG. 10 is a top view illustrating one embodiment of an array of photo detectors.

FIG. 10 is a top view of an embodiment of circular mirror plate 402 and four semi-circular-shaped flexures 404. Each flexure 404 is attached to the optically transmissive substrate (not shown) using posts 406. An advantage to this design is robustness to intrinsic deposited film stress that occurs as mirror plate 402 is formed. When plate 402 is released from the underlying sacrificial layer during the fabrication process, the flexure pattern shown in FIG. 10 allows the plate to rotate slightly and relax against the material stress. FIG. 10 also illustrates the plurality of axes of rotation that allows plate 402 to tilt in any direction up to a predetermined angle.

Mechanical stress in flexures 404 during mirror tilting may allow plate 402 to tilt in some directions in preference to others as the underlying electrodes (shown in outline) are charged. One way to lower these inherent preferences is by increasing the number of flexures. Five or more flexures (disposed substantially evenly spaced around the mirror) can aid in lowering the inherent tilt preferences. In one embodiment, the mirror is in the shape of a polygon of 5 or more sides, with each flexure disposed on a side thereof.

Figure 11:
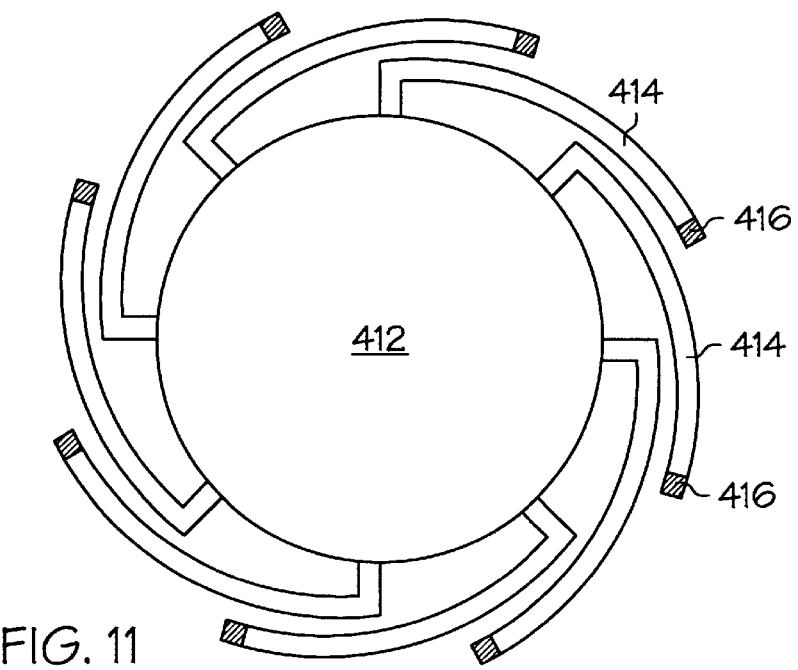
FIG. 11 is a top view illustrating a second embodiment of a mirror plate and flexures.

Seven or more flexures further decrease the inherent tilt direction preferences. FIG. 11 is a top view of an embodiment of a circular mirror plate 412 and eight semi-spiral-shaped flexures 414. Each flexure 414 is attached to the optically transmissive substrate (not shown) using posts 416. This design is also robust to intrinsic deposited film stress, allowing plate 412 to rotate upon release from the sacrificial layer during the fabrication process. In addition, the design shown in FIG. 11 is more robust to mechanical stresses that occur in flexures 414 during mirror plate displacement, thereby allowing more even tilting in all directions. Odd numbers of flexures, or a number of flexures greater than eight, could also be used. In one embodiment, five or more flexures (e.g. from 5 to 12) are provided to allow more even tilting in all directions. The mirror plate can be any suitable shape, though preferably it can be constructed as a circular disc or a polygon corresponding to the number of flexures (e.g. a pentagon with 5 flexures, a hexagon with six flexures, etc., one flexure on each side). The mirrors of this embodiment as well as all embodiments described herein can be interconnected with interconnects 342 as shown in FIG. 9.

Figure 12:
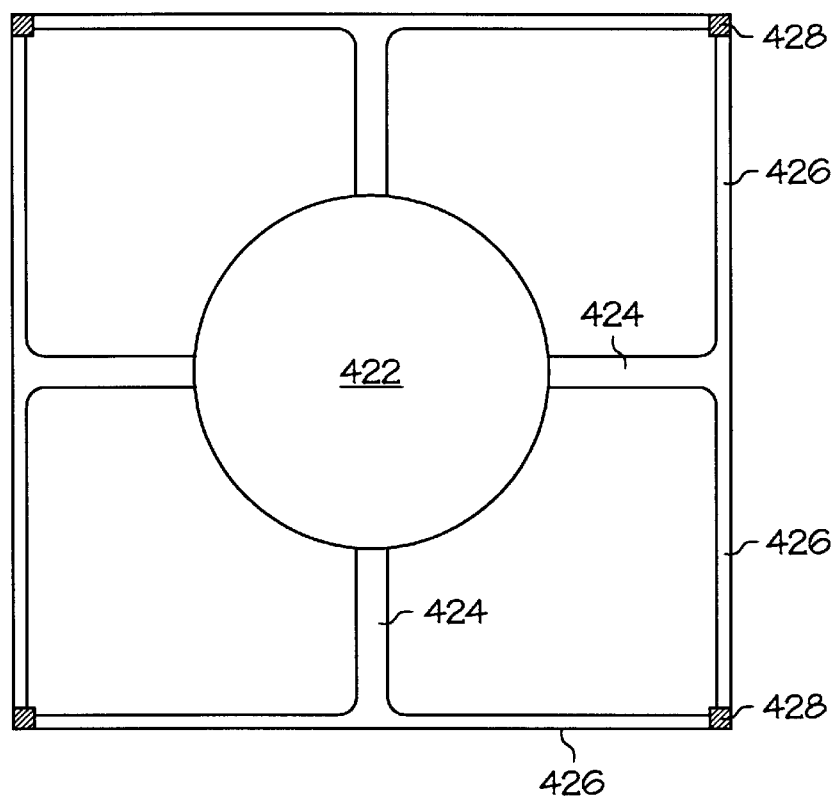
FIG. 12 is a top view illustrating a third embodiment of a mirror plate and flexures.

FIG. 12 is a top view of a third embodiment of circular mirror plate 422 and an array of flexures 424 and 426. The array of flexures is attached to the optically transmissive substrate (not shown) using support posts 428. As mirror plate 422 is displaced, flexures 424 generally twist and bend and flexures 426 generally bend and stretch. The mechanical restorative forces in this flexure design are inherently non-linear, and so the design shown in FIG. 12 may be used to compensate for the increasing electrostatic force between mirror plate 422 and an underlying electrode (not shown) as the distance between the plate and the electrode decreases.

Figure 13:
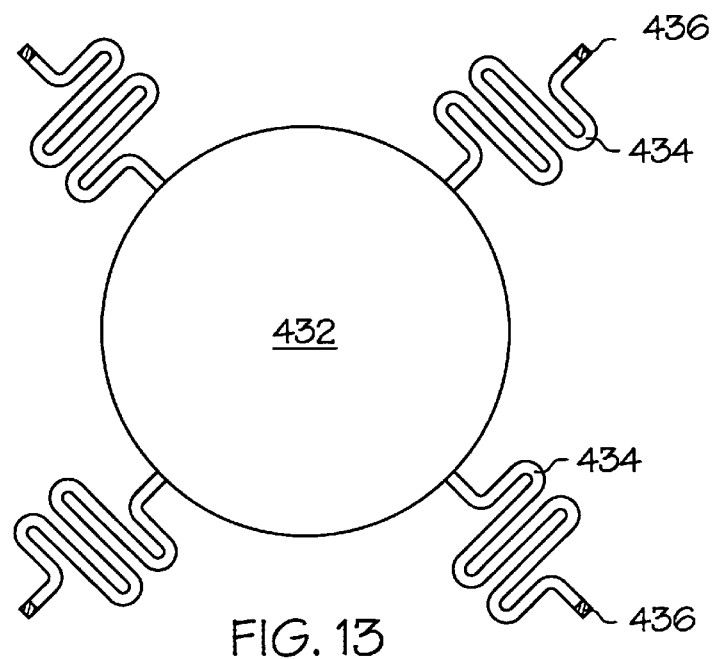
FIG. 13 is a top view illustrating a fourth embodiment of a mirror plate and flexures.

FIG. 13 is a top view of a fourth embodiment of circular mirror plate 432 and four S-shaped flexures 434. Each flexure 434 is attached to the optically transmissive substrate (not shown) by using posts 436. Each flexure 434 acts as a simple spring and the design has low sensitivity to both absolute stress in the flexures, due to low lateral spring constant, and stress gradients in the flexures, due to the small physical extent.

Figure 14:
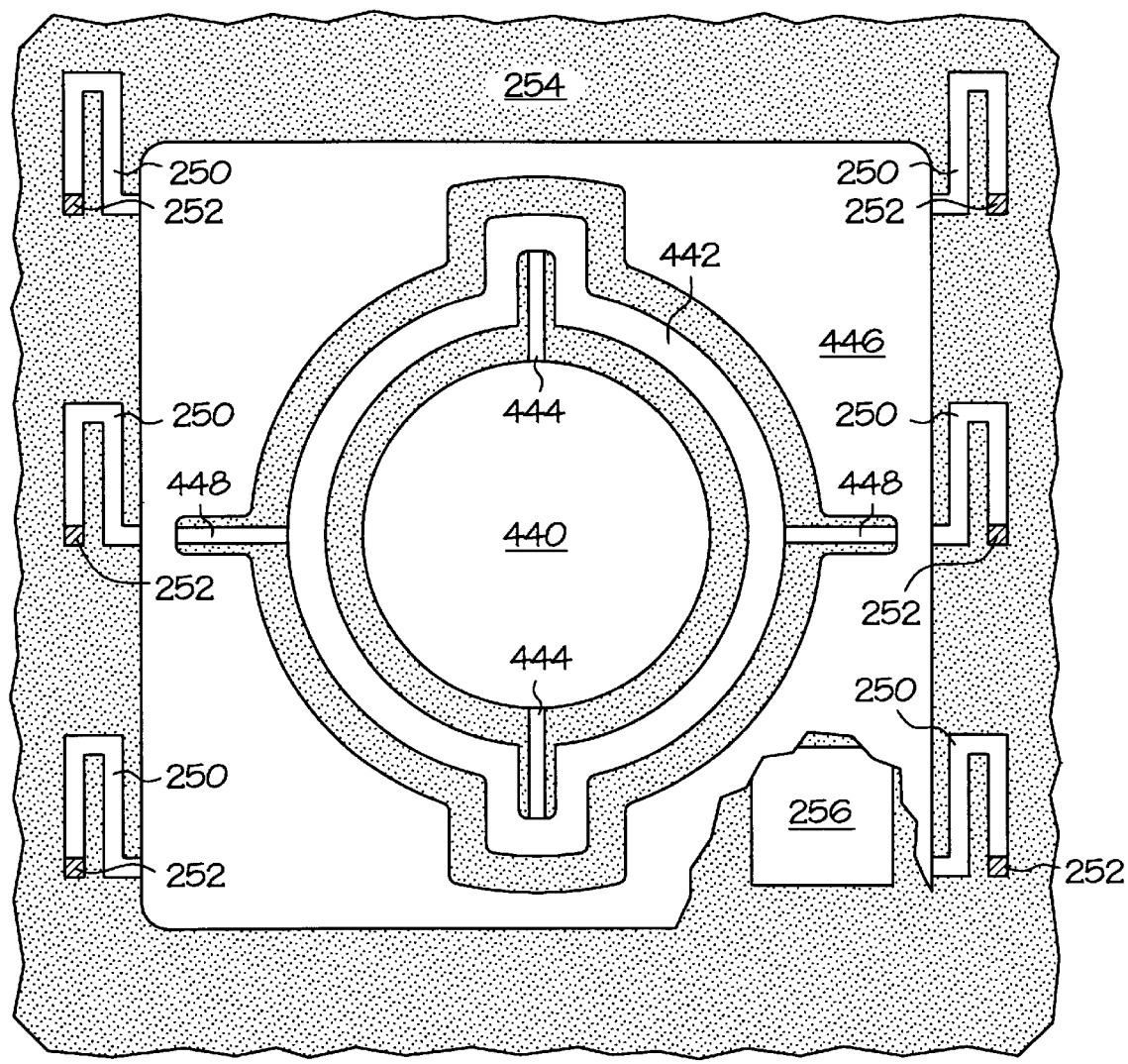
FIG. 14 is a top view illustrating a fifth embodiment of a mirror plate and flexures.

FIG. 14 is a top view of a fifth embodiment of a mirror plate and flexure design. Mirror plate 440 is attached to gimbal ring 442 using torsion flexures 444. Gimbal ring 442 is attached to support frame 446 using torsion flexures 448 aligned orthogonally to flexures 444. Frame 446 is attached to the optically transmissive substrate (not shown) using flexures 250 that are each attached to support posts 252 on the bottom surface of the optically transmissive substrate. Additional electrodes are positioned on active substrate 254 underneath frame 446, as illustrated by electrode 256. The electrodes positioned directly under frame 446 pull frame 446 away from the supporting optically transmissive substrate, while electrodes positioned directly under plate 440 cause the plate to tilt as described herein.

The various mirror plate and flexure combinations described and shown herein are illustrative and many variations are possible.

Figure 15:
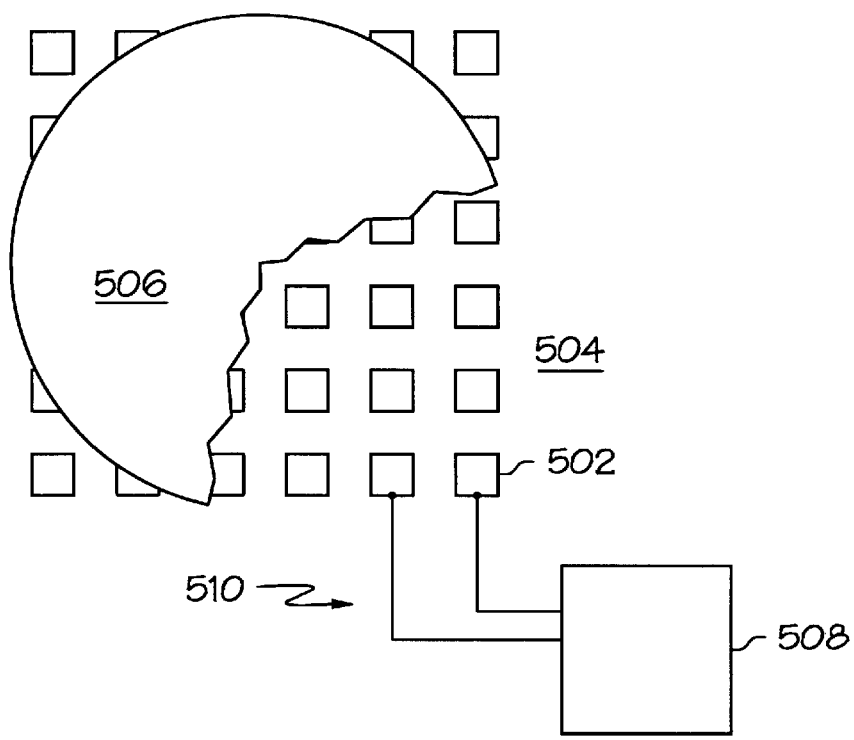
FIG. 15 is a top view illustrating an array of electrodes positioned under a mirror plate.

FIG. 15 is a top view illustrating an array of many small electrodes 502 positioned on active substrate 504 under mirror plate 506. Each electrode is independently electrically coupled to conventional control circuit 508 that provides an electric charge to each electrode via conventional electrically conductive interconnects 510 (only two are shown for clarity). The charge state of each individual electrode can be associated with one of two binary logic states. Thus each electrode has either one charge state (logic low or "off") or a second charge state (logic high or "on"). The displacement of mirror plate 506 is therefore dependent on the number and position of each unique electrode that is charged to produce an attractive force. The number, shape, and arrangement of the electrodes shown is illustrative. In some embodiments analog (continuous) charge states are applied to one or more electrodes 502, while binary (discrete) charge states are applied to other electrodes.

Figure 16:
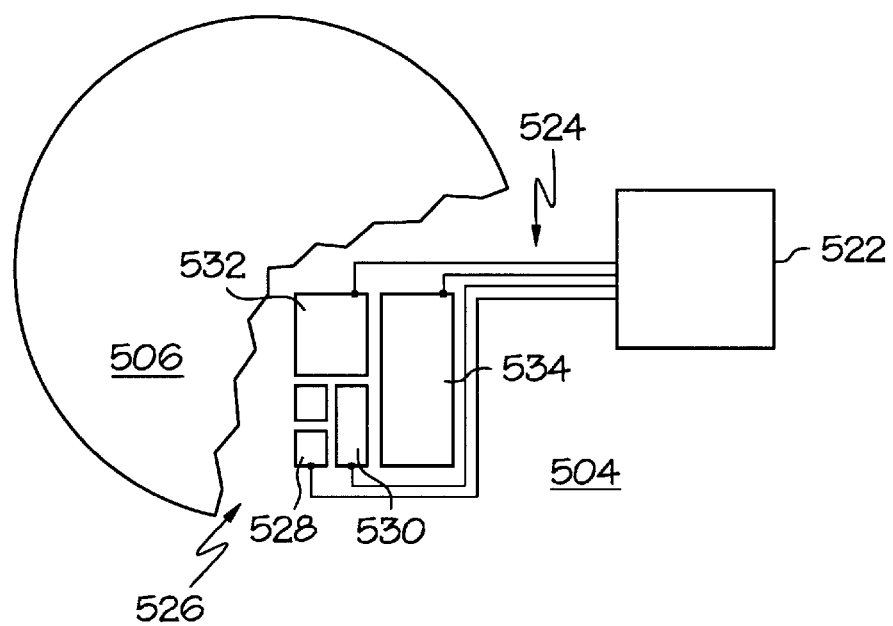
FIG. 16 is a top view illustrating a second array of electrodes positioned under a mirror plate.

FIG. 16 is a top view illustrating a second array of electrodes positioned on active substrate 504 under mirror plate 506. Each electrode is electrically connected to conventional control circuit 522 via conventional electrically conductive interconnects 524, and each electrode is part of an electrode group 526. The electric charge state of each individual electrode in the group is associated with one of two binary logic states as described above, and the relative sizes of the electrodes in group 526 differ so that the electrostatic force between each electrode and the mirror plate are additive in the binary number system. As shown in FIG. 16, for example, the relative areas of electrodes 528, 530, 532, and 534 are 1, 2, 4, and 8, respectively. For group 526, therefore, 16 discrete electrostatic force levels may be created between the electrodes in group 526 and the oppositely charged mirror plate. That is, electrode 528 is associated with the binary placeholder for the number 1 (0001), electrode 530 is associated with the binary placeholder for the number 2 (0010), electrode 532 is associated with the binary placeholder for the number 4 (0100), and electrode 534 is associated with the binary placeholder for the number 8 (1000). Many electrode groups similar to group 526 are positioned under mirror plate 506. The individual electrode areas, shapes, and arrangements within electrode group 526 as shown in FIG. 16 are illustrative and many configurations exist, depending on the group position under the mirror plate.

The electrostatic attractive force between an electrode and the mirror plate increases as the distance decreases. Thus, in some embodiments a large number of electrodes are activated to begin tilting the mirror plate to a desired angle. Then, electrodes near the perimeter of the tilted mirror plate are turned off as the mirror plate reaches the desired tilt angle. The electrostatic force of the electrodes that remain charged will hold the mirror plate at the desired angle. In this way, the response time to reach a desired mirror tilt angle is reduced.

The use of the digital (selected electrode activation to charge states associated with binary logic values) to analog (mirror tilt angle) conversion as illustrated by FIGS. 15 and 16 may also be performed by electrodes that are formed on the same substrate that supports the mirror plate.

Figure 2:
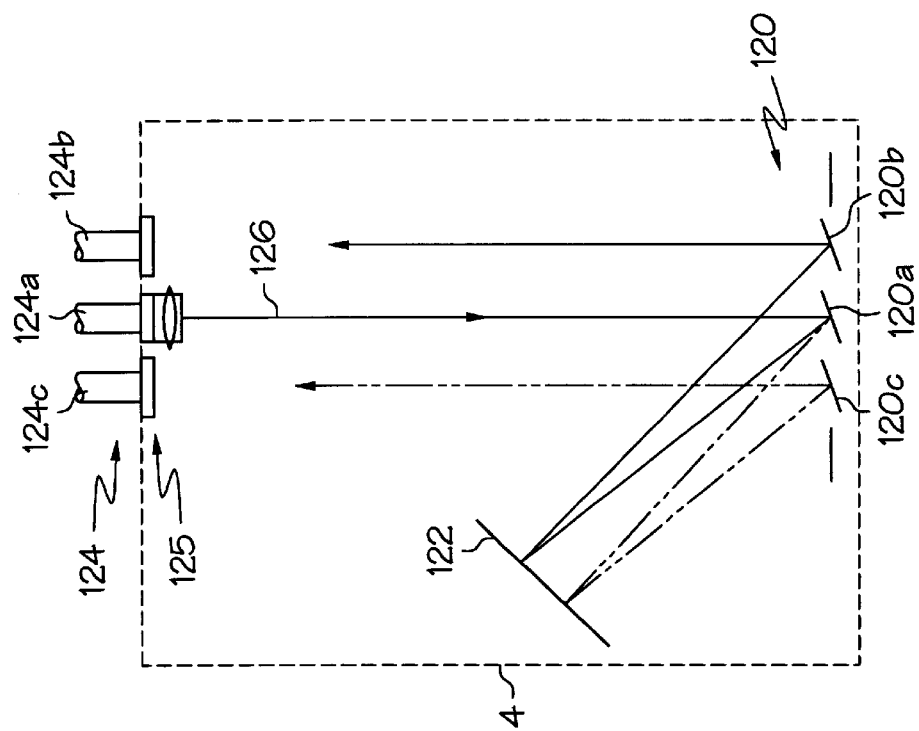
FIG. 2 illustrates a second architecture of an optical switch using micromechanical mirrors.
Figure 1:
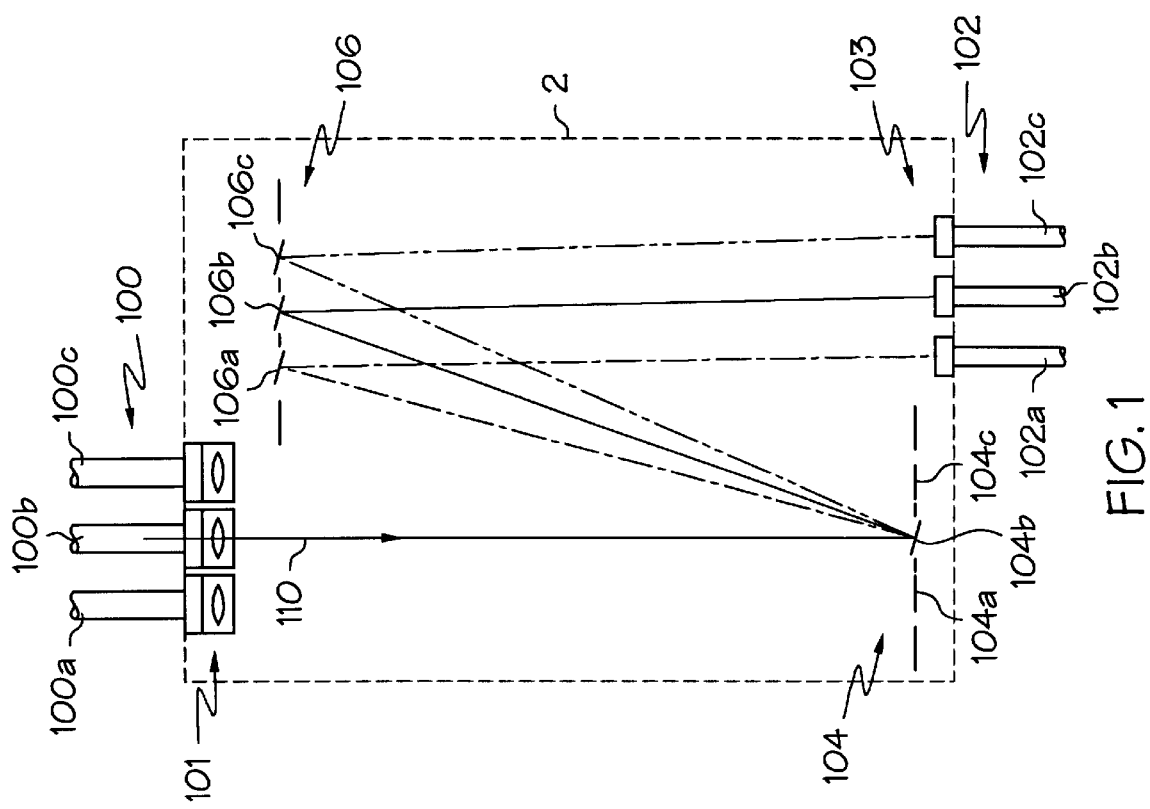
FIG. 1 illustrates one architecture of an optical switch using micromechanical mirrors.
Figure 3:
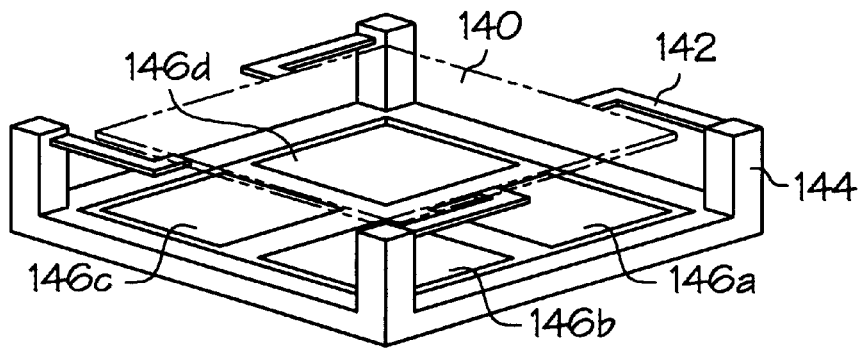
FIG. 3 is a perspective view of a micromechanical mirror.
Figure 4:
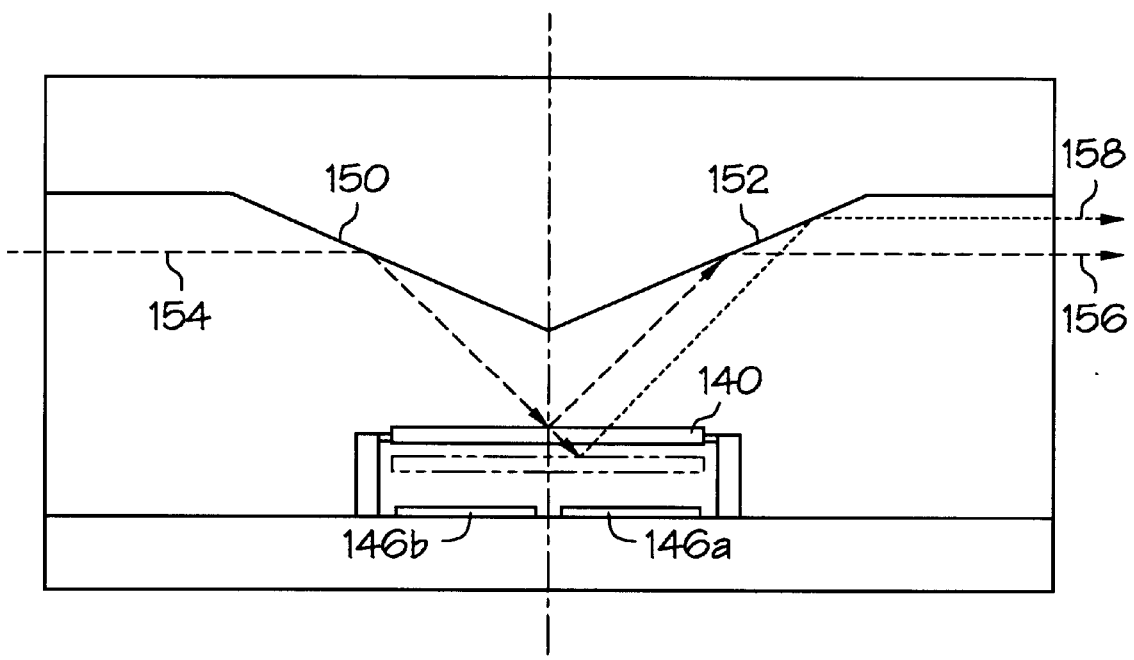
FIG. 4 is a cross-sectional view that illustrates optical switching device operation.

Embodiments of the light beam steering device may be used in optical cross-connect switch architectures such as those shown in FIGS. 1 and 2. Such architectures typically use mirrors arranged in two-dimensional arrays. Mirrors arranged in a single dimension (line) should also be capable of tilting in multiple directions in accordance with the present invention so as to provide the fine alignment required to hit, for example, a 1.0 µm diameter target at a distance of 10 centimeters (cm). The electrode configurations and associated control circuitry described herein provide such fine steering alignment control.

Mirror angle during displacement should be monitored to compensate for drift due to, for example, thermal changes, residual charge build up, or charge migration in the device. Fine control of mirror plate tilt is therefore desirable not only to deflect the mirror so as to properly reflect a light beam between known source and target locations, but to actively compensate for environmental changes within the mirror array.

Figure 17:
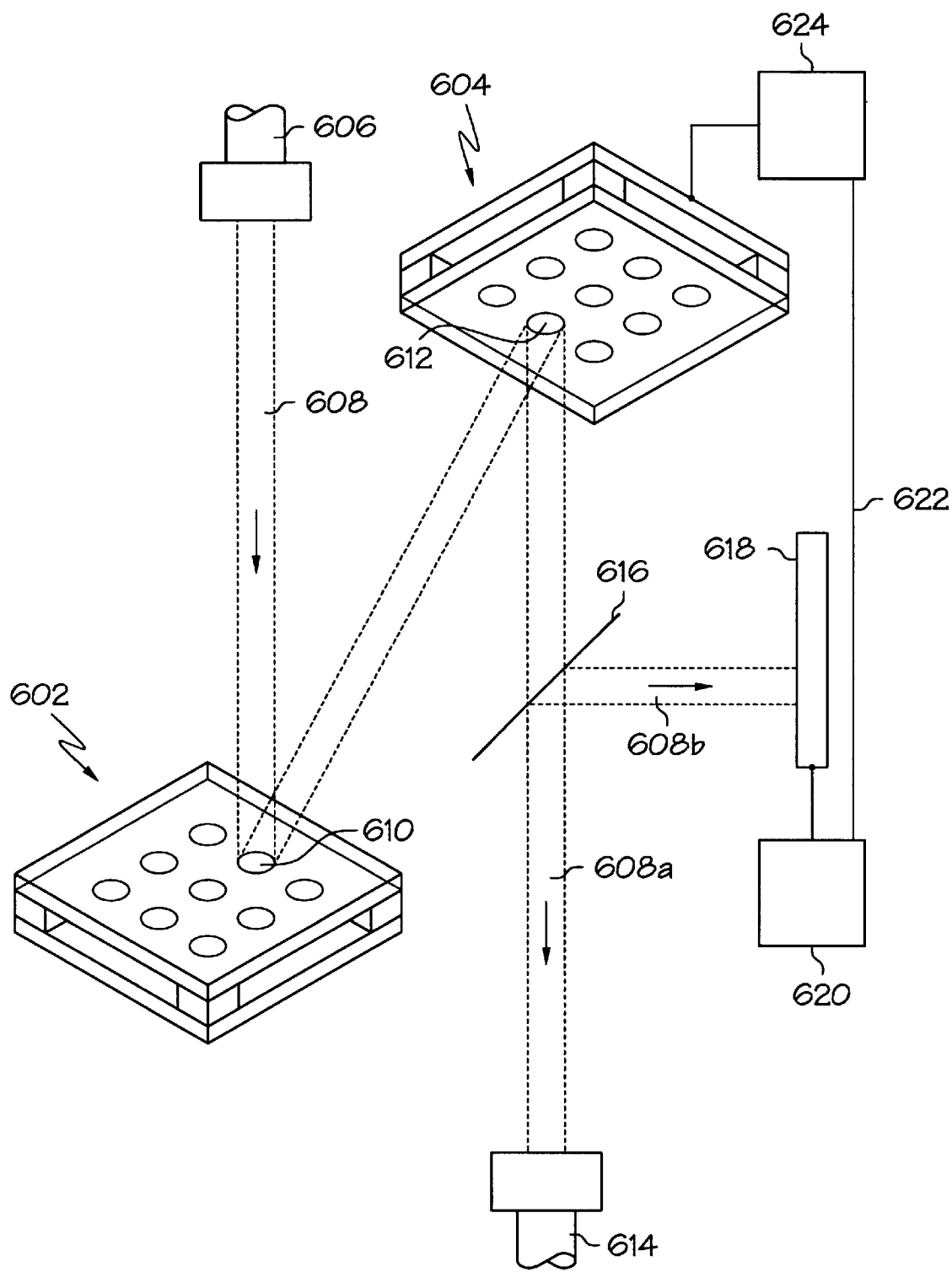
FIG. 17 is a diagram illustrating one embodiment of an architecture for beam position monitoring and adjustment.

FIG. 17 shows two opposing micromirror arrays 602 and 604 oriented so that the mirrors in each array face opposite each other. Light entering through input fiber 606 is collimated to form beam 608. Mirror 610 is deflected so as to reflect beam 608 onto mirror 612, which, in turn, is deflected to reflect beam 608 towards output fiber 614. Beam 608 is incident on conventional beam splitter 616 that produces beam 608a that continues towards output fiber 614 and beam 608b that is incident on a conventional photodetector array (e.g., charge coupled device (CCD)) array 618. The light in beam 608b is a fraction (e.g., ten percent) of the light in beam 608. The position of beam 608b incident on photodetector array 618 changes as mirror 612 deflects. Thus the position of beam 608a with respect to output fiber 614 is easily determined. Signals from the individual light sensors (photodetectors) in array 618 are processed by detector circuit 620 to form a feedback loop. Circuit 620 could be, for example, a digital signal processing or microcontroller circuit with appropriate analog-to-digital and digital-to-analog convertors. The beam position information from detector circuit 620 is sent via line 622 to mirror control circuit 624 that is located either on or off array 604. Control circuit 624 then makes fine adjustments to the mirror 612 displacement position so as to steer beam 608a in the proper direction. In practice, the positions of beams from each mirror in arrays 602 and 604 are monitored using such a structure (a beam splitter can redirect a portion of the set of light beams traveling from mirror array 602 to mirror array 604 to another photodetector array (additional beam splitter and photodetector array not shown). In some embodiments, control circuit 624 includes a conventional memory that stores information that correlates activation settings for the electrodes controlling mirror 612 and the correct beam position.

Figure 18:
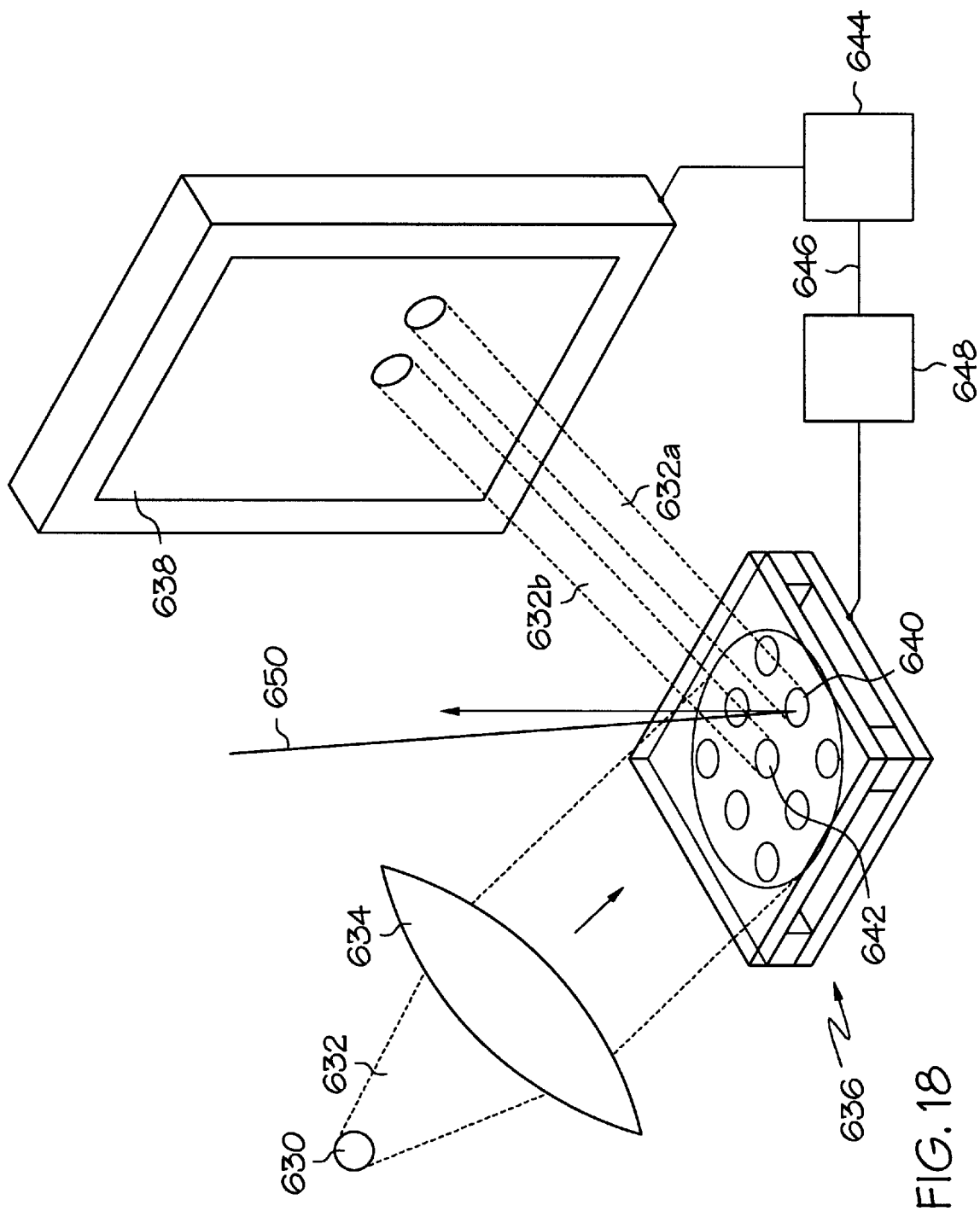
FIG. 18 is a diagram illustrating a second embodiment of an architecture for beam position monitoring and adjustment.

FIG. 18 illustrates a second monitoring embodiment. Conventional light source 630 produces light 632 that passes through conventional optics (e.g., lens to provide collimation) 634 and is incident on the mirrors in micromirror array 636. Each mirror reflects a portion of light 632 onto conventional photodetector array 638. As shown in FIG. 18, for example, portions of light 632 are reflected from mirrors 640 and 642 as beams 632a and 632b, respectively, that are incident on the photodetectors in array 638. Reflected beams from the other mirrors in array 636 are omitted for clarity. Signals from the individual light sensors (photodetectors) in array 618 are processed by detector circuit 644. The beam position information from circuit 644 is sent via line 646 to mirror control circuit 648 that makes fine adjustments to each mirror position based on the positions of the beams incident on array 638.

The monitoring embodiment shown in FIG. 18 may be concurrently operated during information carrying beam switching. For example, FIG. 18 shows mirror 640 steering information carrying beam 650 from an optical fiber towards a second micromirror array.

A third beam position monitoring embodiment is shown in FIG. 10. Conventional photodetectors 660 are positioned on active substrate 662 in a ring around the area underlying mirror plate 402. The number, position, and shape of photodetectors 660 are illustrative. A beam reflected from another mirror, for example, will be incident on mirror plate 402. Any positional displacement of the incident beam will cause uneven detection readings in surrounding photodetectors 660. The direction of the positional displacement of the beam is determined by the photodetectors receiving the largest amount of light. The detection signals from photodetectors 660 are sent to detection circuit 664. Circuit 664 determines the direction in which the incident beam is displaced and provides the positional displacement information to the control circuit for the mirror that steers the beam onto mirror plate 402. A similar array of surrounding photodetectors may be used at the receiving end (terminal) of the output optical fiber. The light blocking layer on the surface of the optically transmissive substrate is configured to allow incident light to reach the photodetectors on the underlying active substrate.

Figure 19:
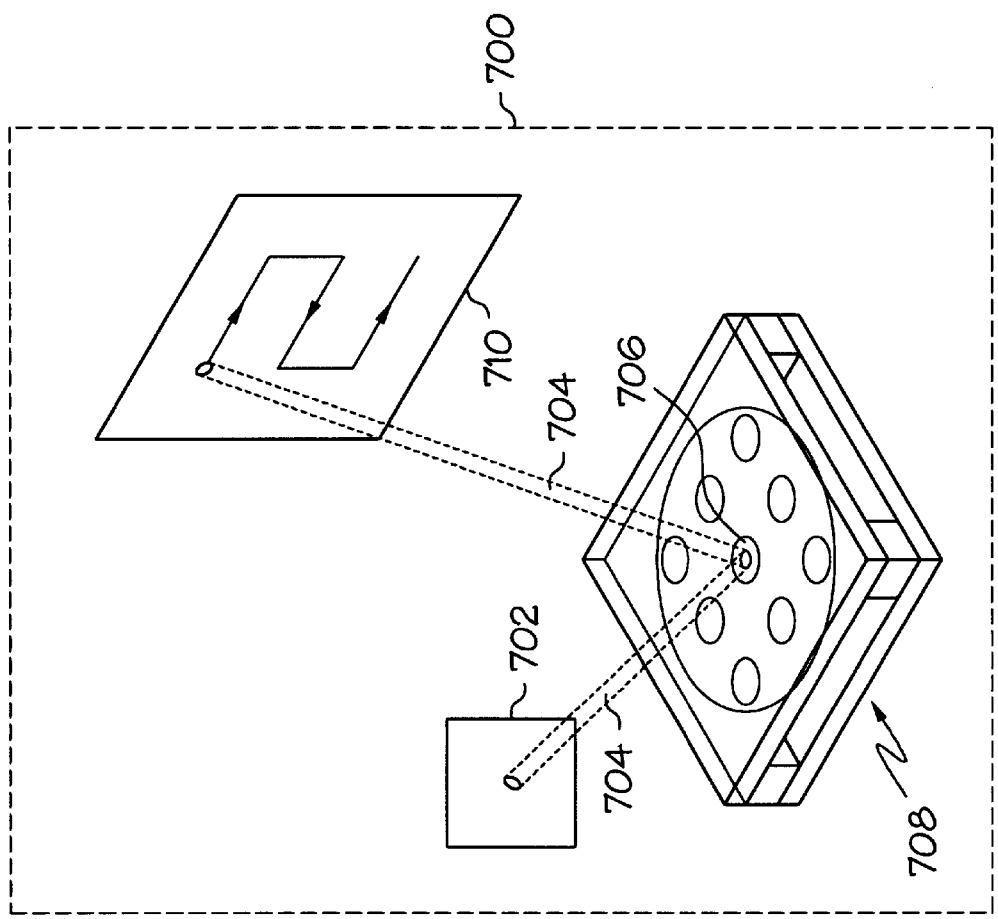
FIG. 19 is a diagram illustrating an optical beam scanner.

Embodiments are not limited to use in optical cross-connect switches. For example, FIG. 19 is an illustration of an embodiment used in an optical beam scanner 700. Conventional light source 702 (e.g., a laser) directs light beam 704 onto mirror plate 706 in steering device 708. Beam 704 is reflected towards target 710. Mirror plate 706 is tilted using the underlying electrodes so that the reflected beam traces a pattern on target 710. As shown in FIG. 19, for example, the pattern is a raster scan. Other patterns include vector scans. Several beams may be directed at other mirror plates in steering device 708 to simultaneously trace additional beam patterns on target 710 or on other targets. Scanned-beams are used in a broad number of applications, including imagers, printers, bar code readers, and optical reading and writing systems.

The invention has been described in terms of specific embodiments. Nevertheless, persons familiar with the field will appreciate that many variations exist in light of the embodiments described herein. The invention is therefore limited only by the following claims.

We claim:

1. A light beam steering device comprising:
   an optically transmissive substrate;
   a movable element held on the optically transmissive substrate by a plurality of flexures, the flexures coupled directly or indirectly to the optically transmissive substrate and the movable element;
   and wherein the flexures permit the movable element to tilt around a plurality of axes so as to deflect light incoming through the optically transmissive substrate back through the optically transmissive substrate;
   a device substrate spaced apart from the optically transmissive substrate such that the movable element is between the device substrate and the optically transmissive substrate.

2. The device of claim 1 further comprising an opaque layer formed over a portion of the optically transmissive substrate.

3. The device of claim 1 wherein the movable element comprises a mirror plate that includes a laminated structural support layer.

4. The device of claim 1 wherein the movable element is both conductive and reflective, and wherein the movable element comprises an electrically conductive and reflective layer or separate electrically conductive and reflective layers.

5. The device of claim 4, further comprising a second electrically conductive layer extending from the electrically conductive layer of the mirror plate to an electrically conductive trace formed over a surface of the optically transmissive substrate.

6. The device of claim 1 wherein each of the flexures includes a layer comprising silicon nitride.

7. The device of claim 1 wherein one or more of the flexures has a semicircular shape.

8. The device of claim 1 wherein one or more of the flexures has a spiral shape.

9. The device of claim 1 wherein at least a portion of one or more of the flexures has an S-shape.

10. The device of claim 1 wherein the flexures are arranged in an array such that a first flexure extends from the mirror plate to middle position of a second flexure, and the second flexure extends between two of the at least one supports.

11. The device of claim 1 wherein the optically transmissive and device substrates define a space surrounding the mirror plate, and the space is evacuated.

12. The device of claim 1 wherein the optically transmissive and device substrates define a space surrounding the mirror plate, and the space is filled with a gas other than air.

13. The device of claim 1 further comprising:
   a first electric charge of a first polarity placed on the mirror plate;
   a second electric charge of a second polarity, opposite the first polarity, placed on each one of the electrically conductive electrodes such that a constant first electrostatic attractive force exists between the mirror plate and each one of the electrodes; and
   a third electric charge of the second polarity, placed on at least one of the electrodes such that a second electrostatic attractive force exists between the mirror plate and the at least one electrode.

14. The device of claim 1 wherein a unique electrode of the electrically conductive electrodes is electrically coupled to a control circuit, and the control circuit is configured to provide one of two discrete charge states to the unique electrode.

15. The device of claim 1:
   wherein the electrically conductive electrodes include a group having at least a first and a second electrode;
   wherein a first electrostatic attractive force between the first electrode and the mirror plate, caused by a particular voltage difference between the first electrode and the mirror plate, is associated with a first placeholder in a binary number; and
   wherein a second electrostatic attractive force between the second electrode and the mirror plate, caused by the particular voltage difference between the second electrode and the mirror plate, is associated with a second placeholder in the binary number.

16. The device of claim 1 further comprising:
   a photodetector array; and
   a beam splitter, wherein the beam splitter is positioned to direct a portion of a light beam reflected from the mirror plate onto the photodetector array.

17. The device of claim 16 further comprising:
a detector circuit electrically coupled to the photodetector array; and
a control circuit electrically coupled to the detector circuit and to at least one of the electrodes.

18. The device of claim 1 further comprising:
a light source positioned to shine a light beam onto the mirror plate; and
a photodetector array positioned to receive a portion of the light beam reflected by the mirror plate.

19. The device of claim 18 further comprising:
a detector circuit electrically coupled to the photodetector array; and
a control circuit electrically coupled to the detector circuit and to at least one of the electrodes.

20. The device of claim 1 further comprising a photodetector formed on the device substrate adjacent the electrodes.

21. The device of claim 1 further comprising a plurality of photodetectors formed on the device substrate and positioned to receive light that is not incident on the mirror plate.

22. The device of claim 1, further comprising:
a device substrate spaced apart from the optically transmissive substrate such that the movable element is between the device substrate and the optically transmissive substrate; and
electrically conductive electrodes formed on the device substrate opposite the movable element;
wherein the plurality of flexures includes a first flexure extending from the movable element to a gimbal ring, a second flexure extending from the gimbel ring to a supporting frame, and a third flexure extending from the supporting frame to a support post, the support post being mechanically coupled to the optically transmissive substrate.

23. The device of claim 22 further comprising a second electrically conductive electrode formed on the device substrate opposite the supporting frame.

24. An optical switch comprising:
an optical fiber input terminal;
an optical fiber output terminal; and
a beam steering device comprising:
an optically transmissive substrate;
a movable plate;
flexures extending from the movable plate and coupled directly or indirectly to the optically transmissive substrate, and wherein the flexures permit the movable plate to tilt around a plurality of axes so as to deflect light incoming through the optically transmissive substrate back through the optically transmissive substrate;
a device substrate spaced apart from the optically transmissive substrate such that the movable plate is between the device substrate and the optically transmissive substrate.

25. The switch of claim 24 further comprising an opaque layer formed over a portion of the optically transmissive substrate.

26. The switch of claim 24 wherein the movable plate further includes a laminated structural support layer.

27. The switch of claim 24 wherein the electrically conductive layer comprises aluminum.

28. The switch of claim 24 further comprising a second electrically conductive layer extending from the electrically conductive layer of the movable plate to an electrically conductive trace formed over a surface of the optically transmissive substrate.

29. The switch of claim 24 wherein each of the flexures includes a layer comprising silicon nitride.

30. The switch of claim 24 wherein one or more of the flexures has a semicircular shape.

31. The switch of claim 24 wherein one or more of the flexures has a spiral shape.

32. The switch of claim 24 wherein at least a portion of one or more of the flexures has an S-shape.

33. The switch of claim 24 wherein the flexures are arranged in an array such that a first flexure extends from the movable plate to a middle position of a second flexure, and the second flexure extends between two of the supporting posts.

34. The switch of claim 24 wherein the optically transmissive and device substrates define a space surrounding the movable plate, and the space is evacuated.

35. The switch of claim 24 wherein the optically transmissive and device substrates define a space surrounding the movable plate, and the space is filled with a gas other than air.

36. The switch of claim 24 further comprising:
a first electric charge of a first polarity placed on the movable plate;
a second electric charge of a second polarity opposite the first polarity, placed on each one of the electrically conductive electrodes such that a constant first electrostatic attractive force exists between the movable plate and each one of the electrodes; and
a third electric charge of the second polarity, placed on a selected one of the electrodes such that a second electrostatic attractive force exists between the movable plate and the selected electrode.

37. The switch of claim 24 wherein a unique electrode of the electrically conductive electrodes is electrically coupled to a control circuit, and the control circuit is configured to provide one of two discrete charge states to the unique electrode.

38. The switch of claim 24:
wherein the electrically conductive electrodes include a group having a first and a second electrode;
wherein a first electrostatic attractive force between the first electrode and the movable plate, caused by a particular voltage difference between the first electrode and the movable plate, is associated with a first placeholder in a binary number; and
wherein a second electrostatic attractive force between the second electrode and the movable plate, caused by the particular voltage difference between the second electrode and the movable plate, is associated with a second placeholder in the binary number.

39. The switch of claim 24 further comprising:
a photodetector array; and
a beam splitter, wherein the beam splitter is positioned to direct a portion of a light beam reflected from the movable plate onto the photodetector array.

40. The switch of claim 39 further comprising:
a detector circuit electrically coupled to the photodetector array; and
a control circuit electrically coupled to the detector circuit and to at least one of the electrodes.

41. The switch of claim 24 further comprising:
a light source positioned to shine a light beam onto the movable plate; and
a photodetector array positioned to receive a portion of the light beam reflected by the movable plate.

42. The switch of claim 41 further comprising:
- a detector circuit electrically coupled to the photodetector array; and
- a control circuit electrically coupled to the detector circuit and to at least one of the electrodes.

43. The switch of claim 24 further comprising a photodetector formed on the device substrate adjacent the electrodes.

44. The switch of claim 24 further comprising a plurality of photodetectors formed on the device substrate and positioned to receive light that is not incident on the movable plate.

45. The switch of claim 24 further comprising a fixed movable positioned to reflect a light beam from the movable plate to a second movable plate on the steering device.

46. The switch of claim 24 further comprising a second steering device comprising:
- a second optically transmissive substrate;
- a second movable plate including a second electrically conductive layer and a second reflective layer;
- second flexures extending from the second movable plate to second supporting posts, wherein the second posts are mechanically coupled to the second optically transmissive substrate, and wherein the second flexures permit the second movable plate to tilt around a plurality of axes so as to deflect light incoming through the second optically transmissive substrate back through the second optically transmissive substrate at a particular;
- a second device substrate spaced apart from the second optically transmissive substrate such that the second movable plate is between the second device substrate and the second optically transmissive substrate; and
- second electrically conductive electrodes formed on the second device substrate opposite the second movable plate.

47. An optical beam scanner comprising:
- a light source; and
- a beam steering device comprising:
  - an optically transmissive substrate;
  - a movable plate;
  - flexures extending from the movable element and coupled directly or indirectly to the optically transmissive substrate, and wherein the flexures permit the movable plate to tilt around a plurality of axes so as to deflect light incoming through the optically transmissive substrate back through the optically transmissive substrate;
  - a device substrate spaced apart from the optically transmissive substrate such that the movable plate is between the device substrate and the optically transmissive substrate; and
  - electrically conductive electrodes formed on the device substrate opposite the movable plate;
  - wherein the light source is positioned to direct a light beam onto the movable plate of the beam steering device.

48. The optical beam scanner of claim 47, wherein said light source is a laser.

49. The optical beam scanner of claim 48, further comprising a target onto which the light beam reflected from the movable plate is directed.

50. The optical beam scanner of claim 49, further comprising circuitry connected to said electrically conductive electrodes for causing said movable plate to direct said light beam onto said target so as to trace a beam pattern thereon.

51. The optical beam scanner of claim 50, wherein said pattern is a raster scan or a vector scan.

52. The optical beam scanner of claim 49, further comprising additional movable plates for directing additional light beams onto said target or onto additional targets.

53. A printer comprising the optical beam scanner of claim 47.

54. The optical beam scanner of claim 47, further comprising an opaque layer formed over a portion of the optically transmissive substrate.

55. The optical beam scanner of claim 47, wherein the movable plate further includes a laminated structural support layer.

56. The optical beam scanner of claim 47, wherein the electrically conductive layer comprises aluminum.

57. The optical beam scanner of claim 47, further comprising a second electrically conductive layer extending from the electrically conductive layer of the movable plate to an electrically conductive trace formed over a surface of the optically transmissive substrate.

58. The optical beam scanner of claim 47, wherein each of the flexures includes a layer comprising silicon nitride.

59. The optical beam scanner of claim 47, wherein one or more of the flexures has a semicircular shape.

60. The optical beam scanner of claim 47, wherein one or more of the flexures has a spiral shape.

61. The optical beam scanner of claim 47, wherein at least a portion of one or more of the flexures has an S-shape.

62. The optical beam scanner of claim 47, wherein the flexures are arranged in an array such that a first flexure extends from the movable plate to a middle position of a second flexure, and the second flexure extends between two supporting posts.

63. The optical beam scanner of claim 47, wherein the optically transmissive and device substrates define a space surrounding the movable plate, and the space is evacuated.

64. The optical beam scanner of claim 47, wherein the optically transmissive and device substrates define a space surrounding the movable plate, and the space is filled with a gas other than air.

65. The optical beam scanner of claim 47, further comprising:
- a first electric charge of a first polarity placed on the movable plate;
- a second electric charge of a second polarity opposite the first polarity, placed on each one of the electrically conductive electrodes such that a constant first electrostatic attractive force exists between the movable plate and each one of the electrodes; and
- a third electric charge of the second polarity, placed on a selected one of the electrodes such that a second electrostatic attractive force exists between the movable plate and the selected electrode.

66. The optical beam scanner of claim 47, wherein a unique electrode of the electrically conductive electrodes is electrically coupled to a control circuit, and the control circuit is configured to provide one of two discrete charge states to the unique electrode.

67. The optical beam scanner of claim 47:
- wherein the electrically conductive electrodes include a group having a first and a second electrode;
- wherein a first electrostatic attractive force between the first electrode and the movable plate, caused by a particular voltage difference between the first electrode and the movable plate, is associated with a first placeholder in a binary number; and wherein a second electrostatic attractive force between the second electrode and the movable plate, caused by the particular voltage difference between the second electrode and the movable plate, is associated with a second placeholder in the binary number.

68. The optical beam scanner of claim 47, further comprising:

a photodetector array; and a beam splitter, wherein the beam splitter is positioned to direct a portion of a light beam reflected from the movable plate onto the photodetector array.

69. The optical beam scanner of claim 47, further comprising:

a detector circuit electrically coupled to the photodetector array; and a control circuit electrically coupled to the detector circuit and to at least one of the electrodes.

70. The optical beam scanner of claim 47, further comprising:

a light source positioned to shine a light beam onto the movable plate; and a photodetector array positioned to receive a portion of the light beam reflected by the movable plate.

71. The optical beam scanner of claim 70 further comprising:

a detector circuit electrically coupled to the photodetector array; and a control circuit electrically coupled to the detector circuit and to at least one of the electrodes.

72. The optical beam scanner of claim 47, further comprising a photodetector formed on the device substrate adjacent the electrodes.

73. The optical beam scanner of claim 47, further comprising a plurality of photodetectors formed on the device substrate and positioned to receive light that is not incident on the movable plate.

74. The optical beam scanner of claim 47, further comprising a fixed mirror positioned to reflect a light beam from the movable plate to a second movable plate on the steering device.

75. An optical network comprising:

at least one input fiber capable of carrying information at multiple wavelengths of light;

one or more optical demultiplexers for separating multiple wavelengths of light from the at least one input fiber;

an optical switch comprising:

an optical fiber input array comprising a plurality of optical fibers for providing a plurality of light wavelengths for switching;

an optical fiber output array comprising a plurality of optical fibers for receiving a plurality of light wavelengths; and a beam steering device comprising:

an optically transmissive substrate;

a plurality of movable elements;

flexures extending from each movable element and coupled directly or indirectly to the optically transmissive substrate, and wherein the flexures permit each movable element to tilt around a plurality of axes so as to deflect light incoming from one of the plurality of optical fibers of the optical fiber input array and through the optically transmissive substrate back through the optically transmissive substrate to one of the plurality of optical fibers of the optical fiber output array;

one or more optical multiplexers for combining multiple wavelengths of light;

at least one output fiber capable of carrying information at multiple wavelengths of light.

76. The optical network of claim 75, further comprising a silicon circuit substrate disposed on a side of each movable element opposite to that of the light transmissive substrate, the silicon circuit substrate for actuating the movable elements.

77. The optical network of claim 75, wherein the optical fiber input array and the optical fiber output array are part of the same array.

78. The optical network of claim 75, wherein the optical fiber input array and the optical fiber output array are two different arrays.

79. The optical network of claim 75, wherein the plurality of movable elements are an array of micromirrors.

80. The optical network of claim 79, wherein each of the fiber optic input array, the array of micromirrors, and the fiber optic output array are arrays of at least 100×100 units.

\* \* \* \* \*